US007262791B2

(12) United States Patent
Kohno et al.

(10) Patent No.: US 7,262,791 B2
(45) Date of Patent: Aug. 28, 2007

(54) COMMUNICATION APPARATUS AND METHOD, AND STORAGE MEDIUM

(75) Inventors: Akihiro Kohno, Tokyo (JP); Yasuo Nakamura, Yokohama (JP); Koichiro Tanaka, Yokohama (JP); Hiroki Yonezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/358,933

(22) Filed: Jul. 23, 1999

(65) Prior Publication Data

US 2003/0048356 A1   Mar. 13, 2003

(30) Foreign Application Priority Data

Jul. 24, 1998   (JP)  ................................. 10-209354
Dec. 16, 1998   (JP)  ................................. 10-357621

(51) Int. Cl.
*H04N 7/18* (2006.01)
*H04N 5/222* (2006.01)

(52) U.S. Cl. .................................. 348/153; 348/333.01
(58) Field of Classification Search ................ 348/143, 348/153, 159, 14.07, 14.08, 14.09, 14.12, 348/220.1, 154, 155, 333.01; 345/762–763, 345/778, 784, 788, 803, 810, 1.1, 2.1, 2.3, 345/4–5, 977; 386/117
See application file for complete search history.

(56) References Cited

U.S. PATENT DOCUMENTS

| 4,514,641 | A |   | 4/1985  | Tanaka et al. ............. 250/570 |
| 4,825,204 | A |   | 4/1989  | Nakamura ............. 340/825.52 |
| 4,891,639 | A |   | 1/1990  | Nakamura ............... 340/825.5 |
| 5,396,284 | A | * | 3/1995  | Freeman ..................... 348/154 |
| 5,424,772 | A | * | 6/1995  | Aoki et al. ............. 348/220.1 |
| 5,621,429 | A | * | 4/1997  | Yamaashi et al. ........... 345/428 |
| 5,625,410 | A | * | 4/1997  | Washino et al. ............. 348/154 |
| 5,748,898 | A | * | 5/1998  | Ueda .......................... 709/219 |
| 5,751,445 | A | * | 5/1998  | Masunaga ................... 348/220 |
| 5,760,752 | A | * | 6/1998  | Kanba ........................ 345/2.2 |
| 5,819,048 | A | * | 10/1998 | Okazaki et al. ............. 709/233 |
| 5,953,050 | A | * | 9/1999  | Kamata et al. .......... 348/14.05 |
| 6,104,864 | A | * | 8/2000  | Kondo et al. ................ 386/117 |

(Continued)

FOREIGN PATENT DOCUMENTS

JP         9-212323         8/1997

OTHER PUBLICATIONS

Wolf et al., "WebVideo. A tool for WWW-based teleoperation", Proceedings of the IEEE International Symposium on Industrial Electronics, vol. 1, pp. SS268-SS273, Jul. 1997.*

*Primary Examiner*—Gims Philippe
(74) *Attorney, Agent, or Firm*—Fitzpatrick, Cella, Harper & Scinto

(57) ABSTRACT

There is the possibility that the operator misunderstands as if an abnormality has occurred in an apparatus, depending on the state of reception of an image changing in accordance with situation. This problem is solved by providing a reception unit for receiving images generated from a plurality of communication terminals, an output unit for outputting the images received by the reception unit in order to dipslay the images on a display unit as multiple images, and a notification unit for grasping and notifying a state of reception of the images by the reception unit.

9 Claims, 21 Drawing Sheets

U.S. PATENT DOCUMENTS

| | | | |
|---|---|---|---|
| 6,163,817 A * | 12/2000 | Shteyn et al. | 710/8 |
| 6,271,805 B1 * | 8/2001 | Yonezawa | 345/1.1 |
| 6,677,936 B2 * | 1/2004 | Jacobsen et al. | 348/333.01 |
| 2001/0038632 A1 * | 11/2001 | Matsumoto et al. | 370/401 |
| 2002/0054216 A1 * | 5/2002 | Kawashima | 348/211 |
| 2002/0059361 A1 * | 5/2002 | Saruwatari | 709/203 |
| 2002/0120545 A1 * | 8/2002 | Katz | 705/37 |

* cited by examiner

COMMUNICATION APPARATUS AND METHOD, AND STORAGE MEDIUM

BACKGROUND OF THE INVENTION

1. Field of the Invention

The present invention relates to a communication apparatus and method, and a storage medium.

2. Description of the Related Art

Conventionally, a remote system using a plurality of cameras includes a plurality of video cameras, and a synthesizer for performing analog synthesis of the images output from these cameras. Such a system is typically utilized within a relatively small building, and is called a local monitoring system. In contrast to such local monitoring systems, remote monitoring systems have been proposed in which a plurality of cameras are connected to a digital network, such as a LAN (local area network), an ISDN (integrated services digital network), or the like, serving as a public digital network, in order to provide a more flexible system and to connect a larger number of cameras which are present at more remote locations.

In some recent remote monitoring systems, a personal computer or a work station is utilized as a monitoring terminal, and image display using a graphical user interface (GUI), and system control are realized. By utilizing the GUI of the computer as the monitoring terminal, even a person who is not familiar with the apparatus can easily operate the system. In particular, by displaying a control panel of a camera which outputs an image, on a monitor together with an image from the camera, the operability of the system can be improved.

For example, a summary of images from a plurality of cameras, or the details of an image from a specific camera, may be displayed as an image in the conventional system of this type. However, the operability of the display operation and the capability to identify the state of the system are not always acceptable. Therefore, there is room for improvement.

Consider a case in which images from a plurality of cameras are displayed and the processing speed of the monitoring terminal is not high.

The monitoring terminal sequentially expands and displays received compressed images from a plurality of cameras. However, when the calculation speed of the monitoring terminal is not high, the frame rate of the displayed image from each camera is, in some cases, reduced. Furthermore, when the network does not have a sufficient capacity for the transmitted image or images, the frame rate is also reduced.

As a result of frame rate reduction, the operator of such a conventional monitoring system may erroneously recognize that there is an abnormality in the monitoring terminal because a change in the displayed image is small. In another case, even if there is no change in the displayed image because there is an abnormality in the monitoring terminal, the operator may not recognize the abnormality and fail to correctly monitor the image.

This problem arises not only when the number of cameras is large, but also when the resolution of the image received from each camera is high although the number of cameras is small.

SUMMARY OF THE INVENTION

It is an object of the present invention to solve the above-described problems.

It is another object of the present invention to provide a communication apparatus and method including a UI (user interface) which can be more flexibly used, particularly, to provide a communication apparatus and method, and a storage medium capable of clearly indicating the state of transfer of an image which changes depending on situation.

It is still another object of the present invention to provide a new function.

According to one aspect of the present invention, a communication apparatus includes reception means for receiving images generated from a plurality of communication terminals, output means for outputting the images received by the reception means in order to dipslay the images on a display unit as multiple images, and notification means for grasping and notifying a state of reception of the images by the reception means.

According to another aspect of the present invention, a communication method includes the steps of receiving images generated from a plurality of communication terminals, outputting the received images in order to dipslay the images on a display unit as multiple images, and grasping and notifying a state of reception of the received images.

According to still another aspect of the present invention, a communication apparatus includes reception means for receiving a part or all of images generated from image generation units of a plurality of corresponding communication terminals by switching the images, output means for outputting the images received by the reception means in order to display the images on a display unit as multiple images, assigning means for assigning an arbitrary image from among the multiple images, control means for controlling a state of outputting the image assigned by the assigning means, and notification means for grasping and notifying a state of reception of the image by the control means.

According to yet another aspect of the present invention, a communication method includes the steps of receiving a part or all of images generated from image generation units of a plurality of corresponding communication terminals by switching the images, outputting the received images in order to display the images on a display unit as multiple images, assigning an arbitrary image from among the multiple images, controlling a state of outputting the assigned image, and grasping and notifying a state of reception of the assigned image.

According to yet a further aspect of the present invention, a storage medium storing a program is provided, The program includes a reception process code of receiving images generated from a plurality of communication terminals, an output process code of outputting the received images in order to dipslay the images on a display unit as multiple images, and a notification process code of grasping and notifying a state of reception of the received images.

According to still another aspect of the present invention, a storage medium storing a program is provided. The program includes a reception process code of receiving a part or all of images generated from image generation units of a plurality of corresponding communication terminals by switching the images, an output process code of outputting the received images in order to display the images on a display unit as multiple images, an assigning process code of assigning an arbitrary image from among the multiple images, a control process code of controlling a state of outputting the assigned image, and a notification process code of grasping and notifying a state of reception of the assigned image.

The foregoing and other objects, advantages and features of the present invention will become more apparent from the

DETAILED DESCRIPTION OF THE PREFERRED EMBODIMENTS

A first embodiment of the present invention will now be described in detail with reference to the drawings.

Figure 1:
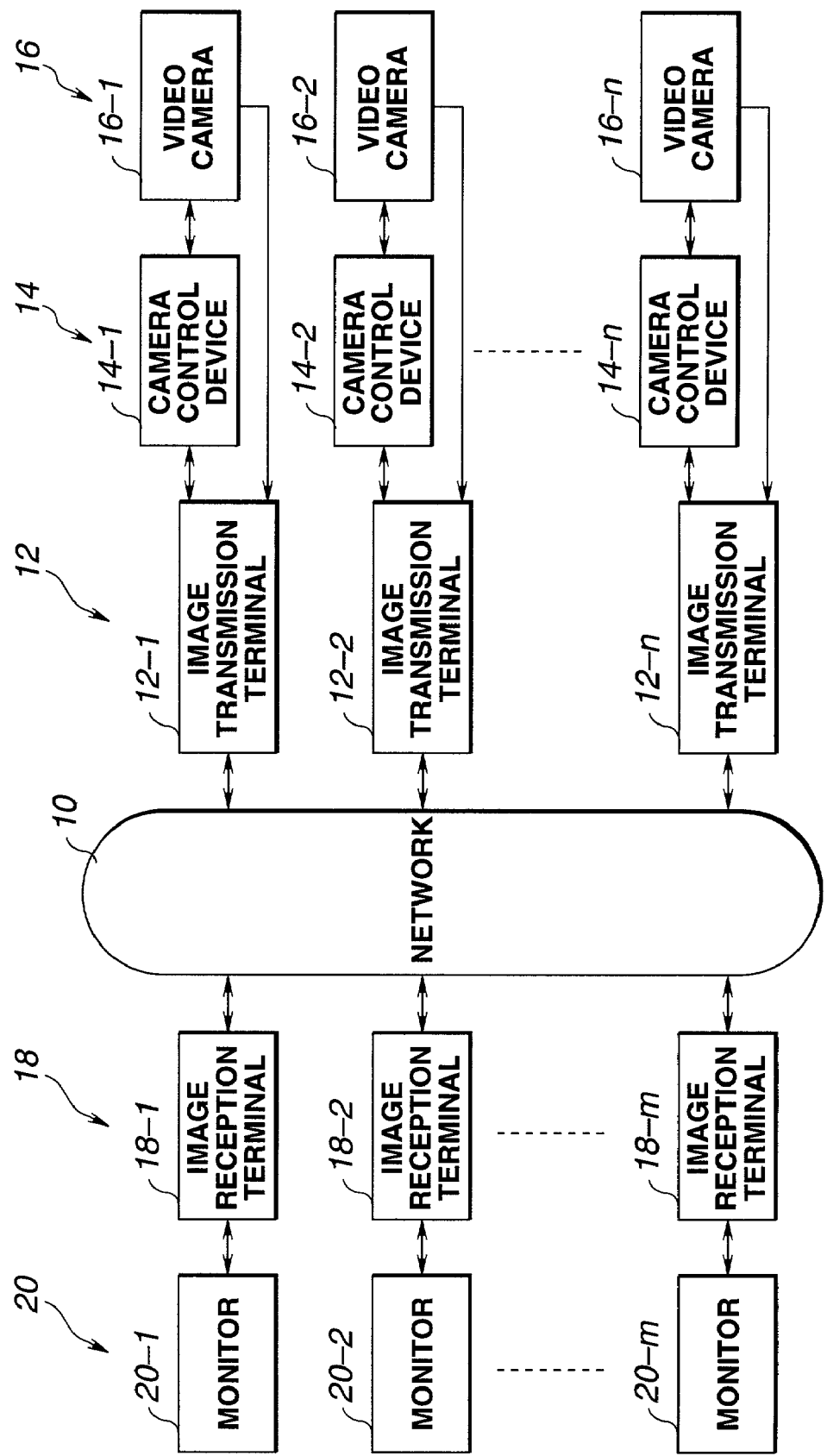
FIG. 1 is a schematic block diagram illustrating the configuration of a system according to a first embodiment of the present invention.

FIG. 1 is a schematic block diagram illustrating the configuration of a system according to the first embodiment.

In FIG. 1, reference numeral 10 represents a digital network performing digital transmission of image data and camera control information (including status information), to which n image transmission terminals 12 (12-1-12-n) are connected. Video cameras 16 (16-1-16-n) are connected to the image transmission terminals 12 (12-1-12-n) via camera control devices 14 (14-1-14-n), respectively. The camera control devices 14 (14-1-14-n) control panning, tilting, zooming, focusing, diaphragms and the like according to control signals from the image transmission terminals 12 (12-1-12-n), respectively. The video cameras 16 (16-1-16-n) are supplied with electric power from the camera control devices 14 (14-1-14-n), so that the camera control devices 14 (14-1-14-n) can control on/off of power supplies of the video cameras 16 (16-1-16-n) according to external control signals, respectively.

Image reception terminals (monitoring terminals) 18 (18-1-18-m) for receiving and displaying image information transmitted from the image transmission terminals 12 (12-1-12-n) are also connected to the network 10. Monitor displays (hereinafter abbreviated as "monitors") 20 (20-1-20-m) are connected to the image reception terminals 18 (18-1-18-m), respectively.

The image transmission terminals 12 (12-1-12-n) compress output images from the connected video cameras 16 (16-1-16-n) according to a predetermined compression method, such as H.261 or the like, and transmit resultant signals to an image reception terminal 18 requesting images or to all the image reception terminals 18 via the network 10. The image reception terminals 18 which have received the images display the received images on image dipslay regions of the corresponding monitors 20. The image reception terminals 18 can control various parameters (the photographing azimuth, the photographing magnification, focus, the stop value and the like) of an arbitrary camera 16 via the network 10, the corresponding image transmission terminal 12 and camera control device 14, as well as electric power supply (from an on-state to an off-state, or vice versa). The details of these operations will be described later.

By providing the image transmission terminal 12 with a monitor, and an image expansion device for expanding a compressed image, the image transmission terminal 12 can operate as an image reception terminal. Similarly, by connecting the camera control device 14 and the video camera 16 to the image reception terminal 18 and providing an image compression device, the image reception terminal 18 can operate as an image transmission terminal. It is, of course, necessary to provide software necessary for image transmission or image reception.

Figure 2:
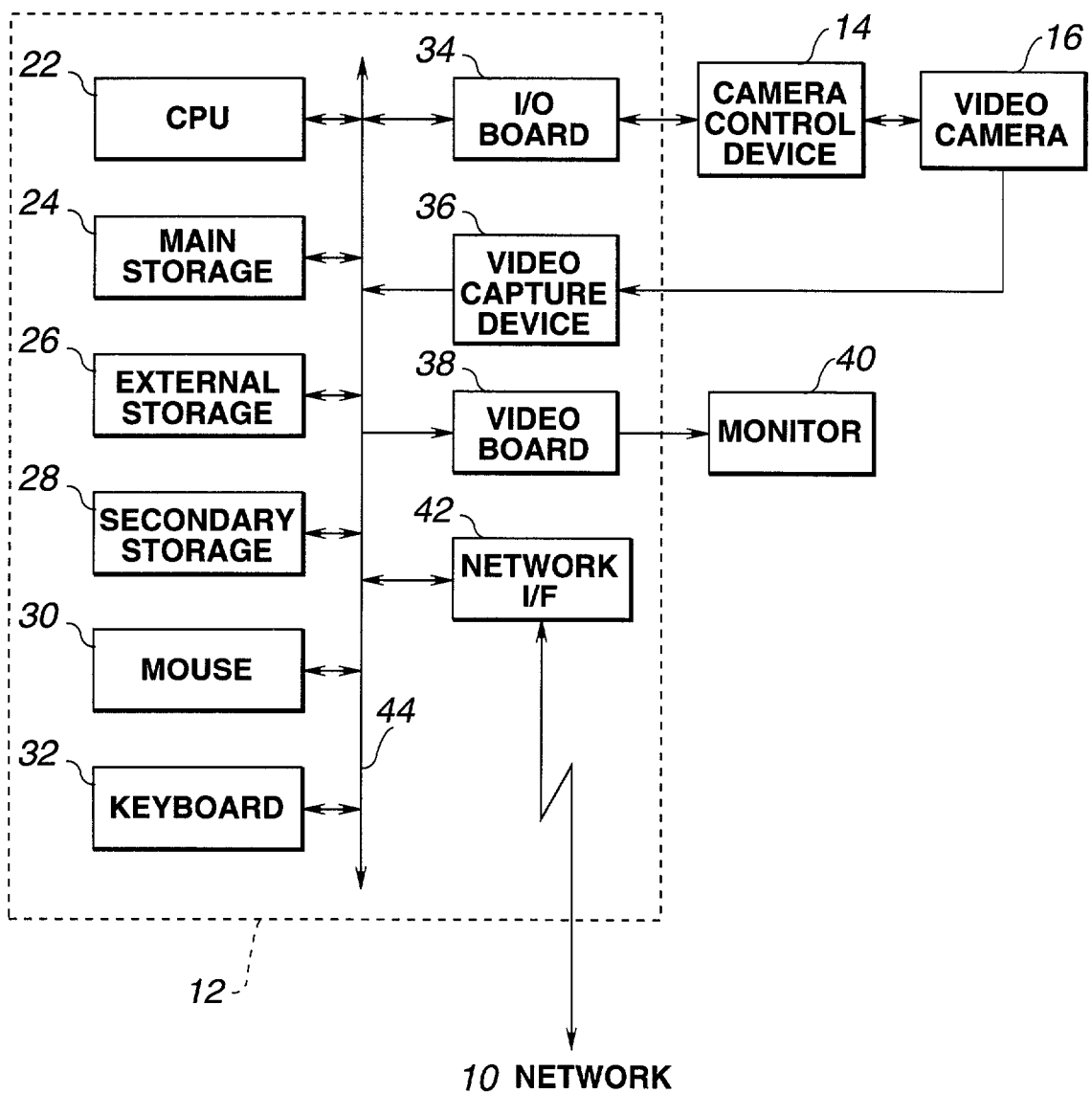
FIG. 2 is a schematic block diagram illustrating the configuration of an image transmission terminal 12 shown in FIG. 1.

FIG. 2 is a schematic block diagram illustrating the configuration of the image transmission terminal 12.

In FIG. 2, there are shown a CPU (central processing unit) 22 for controlling the entire terminal, a main storage 24, a detachable external storage 26, such as a floppy disk, a CD(compact disc)-ROM(read-only memory) or the like, a secondary storage 28, such as a hard disk or the like, a mouse 30 serving as a pointing device, and a keyboard 32. The camera control device 14 is connected to an I/O (input/output) board 34 for transmitting/receiving camera control signals. A video capture device 36 receives a video output signal from the video camera 16. The video capature device 36 of the first embodiment has the A/D (analog-to-digital) conversion function of converting an analog video signal into a digital signal, and the image compression function of compressing information. A video board 38 displays image information on the picture surface of a monitor 40. There are also shown a network interface 42, and a system bus 44 for interconnecting the devices 22-38, and 42.

When the image transmission terminal 12 is dedicated only for image transmission, the video board 38 and the monitor 40 can be, in some cases, omitted.

As can be understood from the foregoing description, the image transmission terminal 12 is a computer. According to the above-described configuration, the image transmission terminal 12 transmits an image to a remote monotoring terminal via the network 10, and controls the camera 16 by receiving camera control signals from the monitoring terminal.

Figure 3:
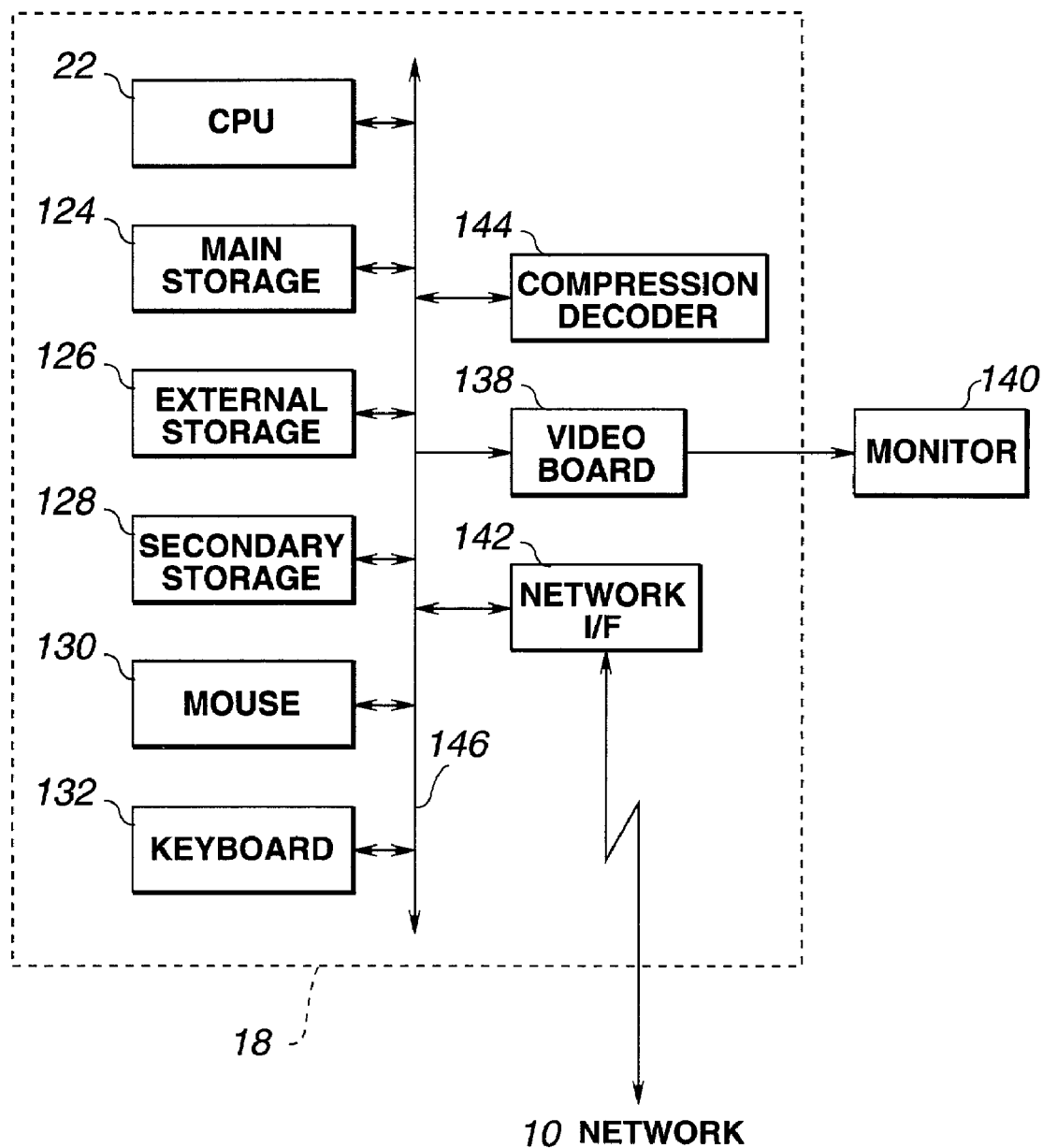
FIG. 3 is a schematic block diagram illustrating the configuration of an image reception terminal (monitoring terminal) 18 shown in FIG. 1.

FIG. 3 is a schematic block diagram illustrating the configuration of the image reception terminal (monotoring terminal) 18.

In FIG. 3, there are shown a CPU 122 for controlling the entire terminal, a main storage 124, a detachable external storage 126, such as a floppy disk, a CD-ROM or the like, a secondary storage 128, such as a hard disk or the like, a mouse 130 serving as a pointing device, and a keyboard 132. A video board 132 displays image information on the picture surface of a monitor 140. There are also shown a network interface 142, and a compression decoder 144 for expanding compressed image information. A system bus 146 interconnects the devices 122-132, 138, 142 and 144.

The image reception terminal 18 has the same configuration as the image transmission terminal 12 shown in FIG. 2, except that the decoder 144 for expanding a compressed image is provided, and system software differs. Some or all of the image reception terminals 18 can provide an arbitrary image transmission terminal 12 or an image transmission terminal 12 for which camera control is allowed with a camera control signal. The image transmission terminal 12 which has received the camera control signal controls the corresponding camera 16 in accordance with the contents of the camera control signal, and transmits the current state of the camera 16. The image reception terminal 18 displays the state of the camera 16 on the monitor 140 in accordance with the received state signal. At the same time, the image reception terminal 18 receives and expands image data transmitted from the image transmission terminal 12, and displays an image represented by the resultant image data on the picture surface of the monitor 140 in real time.

Figure 4:
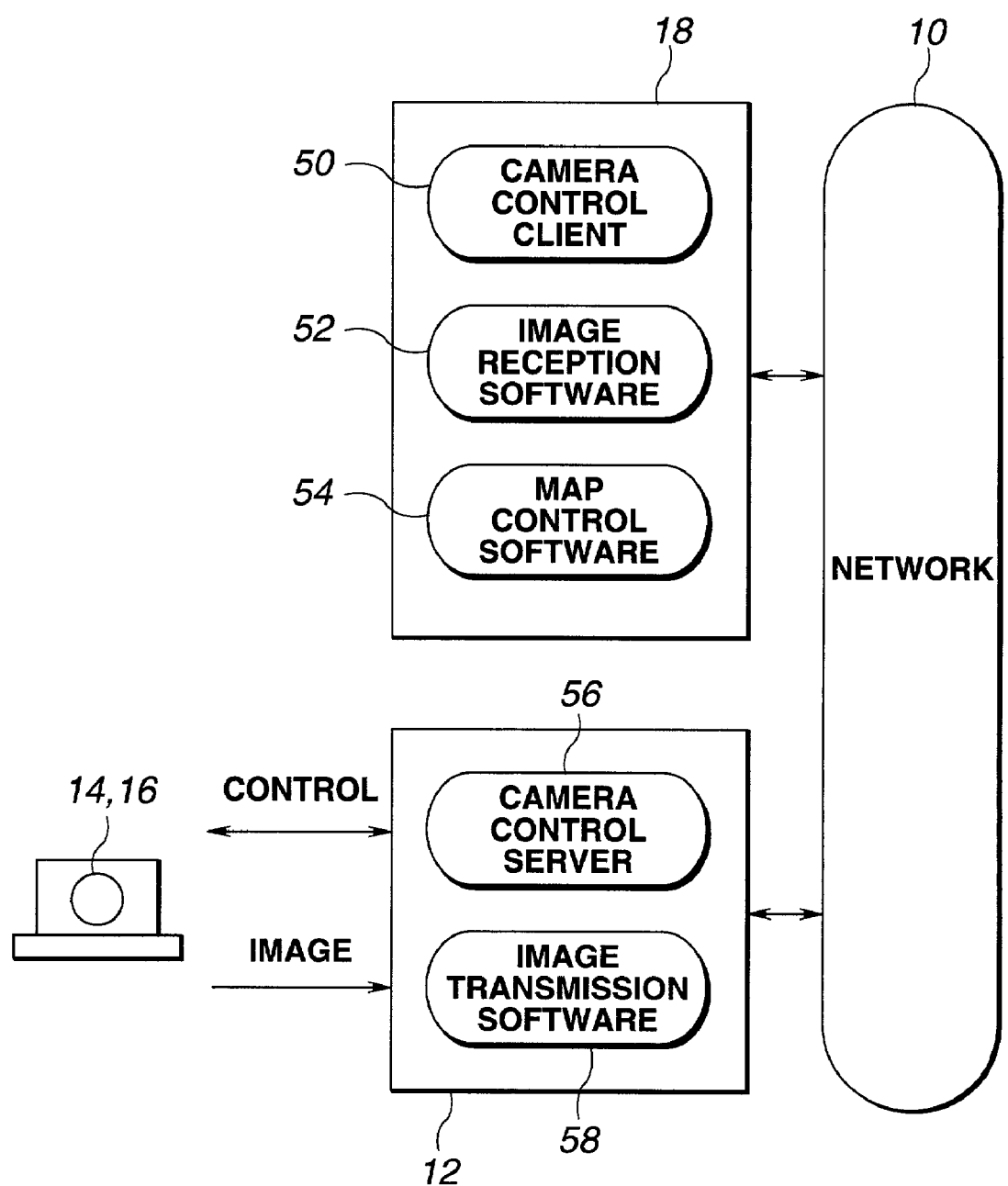
FIG. 4 is a schematic block diagram illustrating the configuration of software used in the first embodiment.

FIG. 4 illustrates the configuration of software used in the first embodiment. A camera control client (software) 50 for performing remote control of the camera 16 connected to the image transmission terminal 12 which is connected to the network 10, image reception software 52 for expanding compressed image data from the image transmission terminal 12 and displays an image represented by the resultant image data on the picture surface of the monitor, and map control software 54 for displaying the disposed position and the current state of each camera 16 on a map as a camera symbol, and an operation panel for operating each camera 16 are installed in the image reception terminal (monitoring terminal) 18.

The image reception software 52 controls the cameras 16 connected to all the image transmission terminals 12 which are connected to the network 10, and includes fixed information and various types of changing information. Non-limiting examples of changing information include, but are not limited to, the name of each camera 16, the name of the host computer to which each camera 16 is connected, the state of each camera 16, such as panning/tilting, zooming or the like, whether each camera 16 is controllable, the camera 16 which is currently controlled, the camera 16 providing the currently displayed image, and the state of image distribution, such as the frame rate or the like. The image reception software 52 utilizes such information for image information display and the like. Such information is also supplied to the camera control client 50 and the map control software 54, and is utilized, for example, for changing the display of the camera symbol.

A camera control server 56 for controlling the camera 16 via the camera control device 14 in accordance with a request from the camera control client 50 and notifying the requester of the current state of the camera 16, and image transmission software 58 for compressing an output image from the camera 16 and transmitting the resultant image to the requester via the network 10 in a predetermined format are installed in the image transmission terminal 12.

Figure 5:
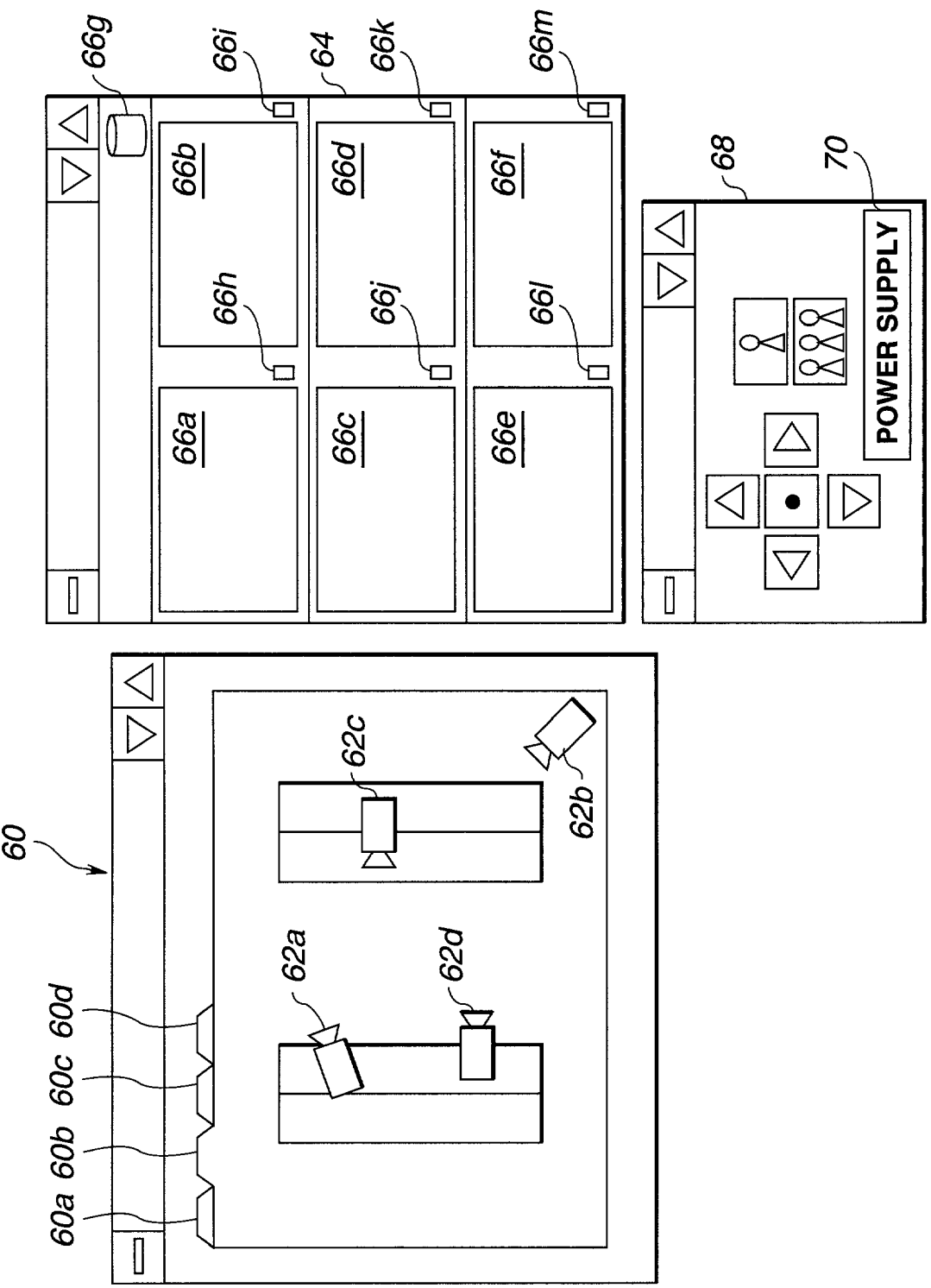
FIG. 5 is a diagram illustrating a monitor picture surface of the image reception terminal 18.

FIG. 5 illustrates an example of the contents of display on the picture surface of the monitor 140 of the image reception terminal 18.

In FIG. 5, a map window 60 shows the layout of an office, a shop, a warehouse or the like where the camera 16 is disposed. A plurality of maps 60a, 60b, 60c and 60d can be switched on the map window 60. The number of the maps 60a, 60b, 60c and 60d which can be displayed depends on the performance of the system, and is not particularly limited. A tag is provided for each of the maps 60a, 60b, 60c and 60d. By clicking a tag by a mouse pointer, the map having the selected tag is dipslayed on the front of the picture surface. Camera icons (camera symbols) 62a, 62b, 62c and 62d indicating respective disposed cameras are also displayed on the map displayed on the front surface. The camera icons 62a, 62b, 62c and 62d are displayed in the directions of the corresponding cameras 16.

An image display window 64 includes a plurality of image display regions 66a-66f. Although in the first embodiment, six image display regions are shown, the number of the image display regions is, of course, not limited to six. A dustbin icon 66g for an operation of interrupting display of an image being displayed is also displayed on the image display window 64. The use of the dustbin icon 66g will be described later.

Image information display regions 66h-66m corresponding to the image display regions 66a-66f, respectively, are also displayed on the image display window 64. The use of the image information display regions 66h-66m will be described later.

Figure 13:
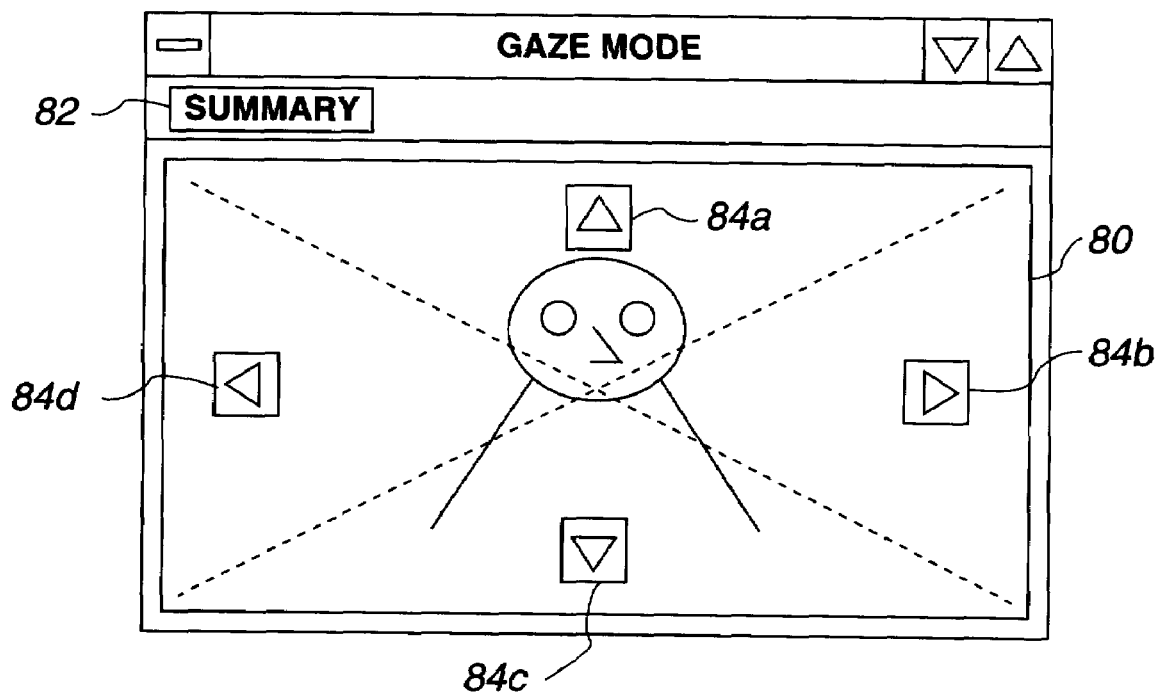
FIG. 13 is a diagram illustrating an image display window 64 in a gaze mode.

The image display window 64 has a display mode in which a summary of a plurality of image display regions is displayed as shown in FIG. 5, and a display mode in which only one of the plurality of images is gazed as shown in FIG. 13. The former mode is termed a summary mode, and the latter mode is termed a gaze mode. The gaze mode can be utilized when it is intended to display one image in a large size or display the details of one image with high resolution. Switching between the summary mode and the gaze mode will be described later.

A camera control panel 68 includes buttons for operating the direction (panning/tilting), zooming and the like of an assigned camera. In the first embodiment, the camera control panel 68 also includes a camera power supply button 70 for operating on/off of the power supply of an assigned camera.

Figure 6:
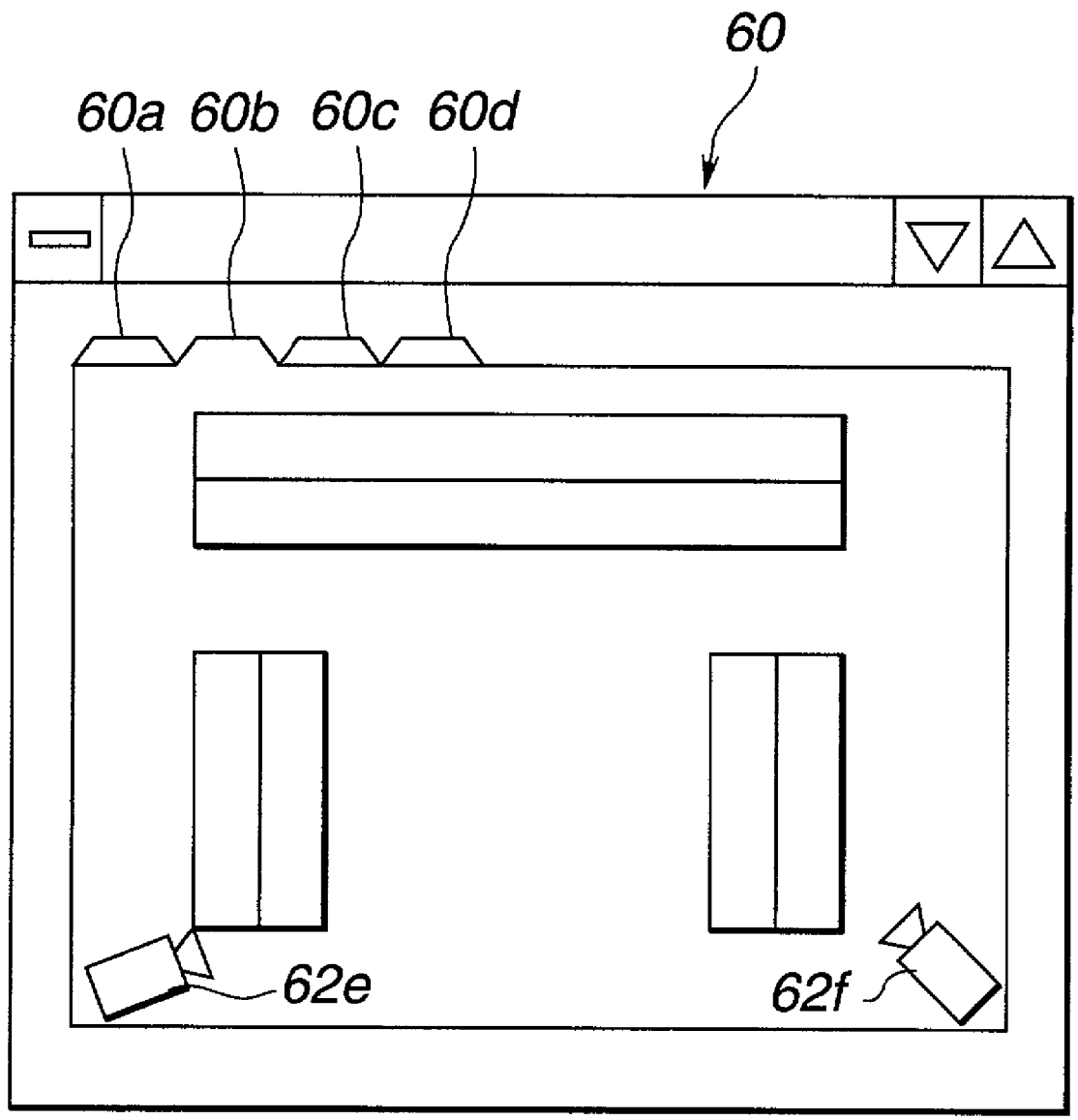
FIG. 6 is a diagram illustrating an example of display of a map window 60 shown in FIG. 5 on the front of which a map 60c is displayed.

For example, when the map 60c is selected, and is displayed on the front surface of the map window 60, a map as that shown in FIG. 6 is displayed. Camera icons 62e and 62f indicating two cameras disposed in the map are also displayed.

The details of camera control in the first embodiment will now be described in detail. When intending to display an image from a camera 16, an operation of selecting the camera icon indicating that camera 16 on the corresponding map of the map window 60, superposing the selected camera icon on one of the image display regions 66a-66f on the image display window 64, and then releasing the camera icon (a so-called drag-and-drop operation), is performed. Usually, an unused region of the image display regions 66a-66f is selected. When the image display region currently being used has been selected, a warning of switching of the camera may be performed, and the user may be asked to select between continuation and interruption. Such processing is known in the art.

Figure 7:
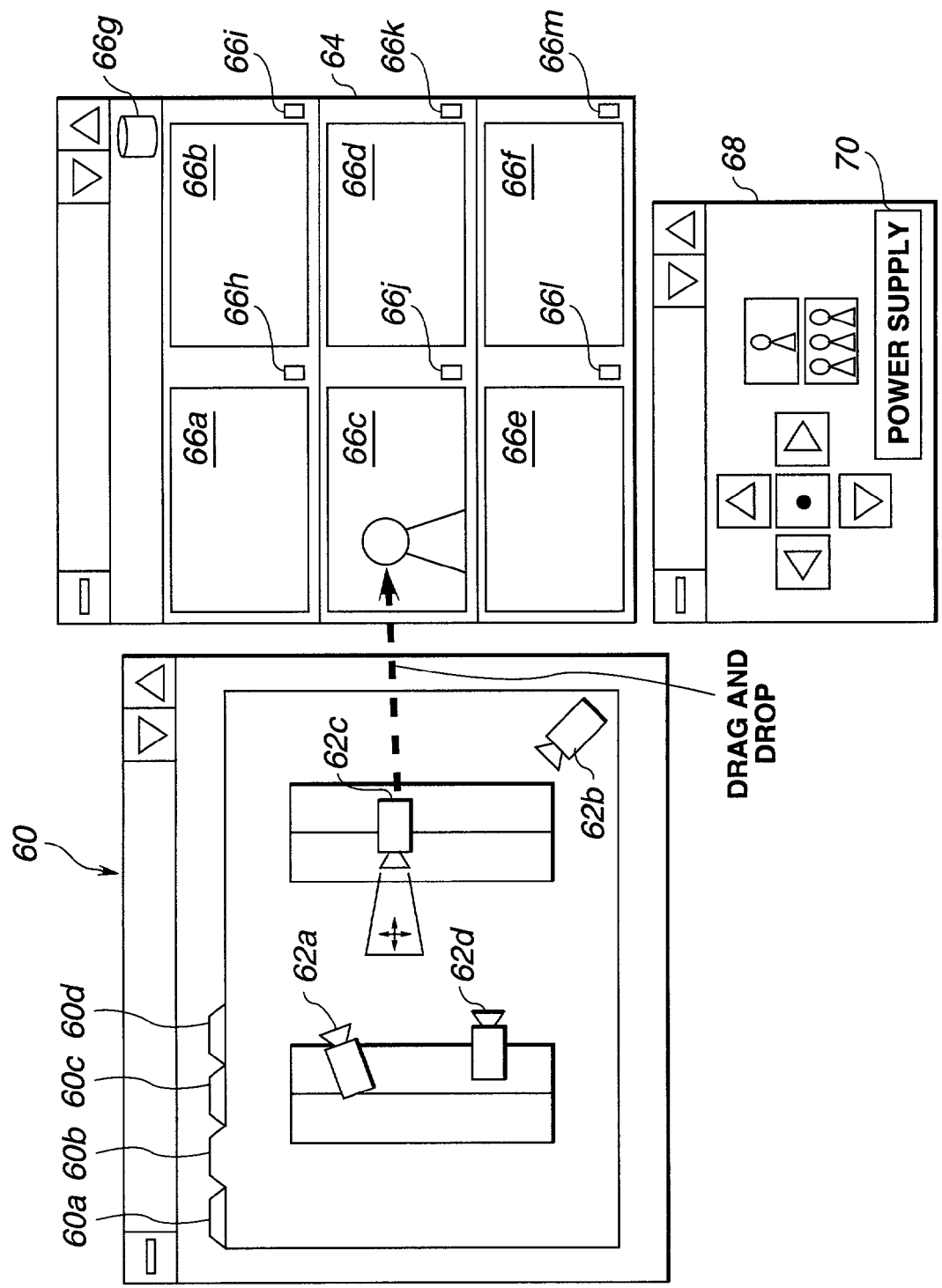
FIG. 7 is a diagram illustrating start of image display/ image information display.
Figure 8:
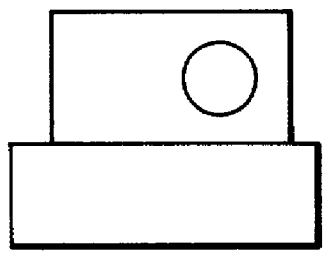
FIG. 8 is a diagram illustrating an example of the shape of a mouse cursor during an operation to start image display.

FIG. 7 illustrates a drag-and-drop operation of the camera icon 62c onto the image display region 66c. An image from the camera represented by the camera icon 62c is displayed on the image display region 66c. While the camera icon is dragged, the shape of the mouse cursor changes into a shape as that shown in FIG. 8, in order to notify the user that the mouse cursor is being dragged for image display. The map control software 54 notifies the image reception software 52 of an ID of the camera represented by the selected camera icon. The image reception software 52 checks the direction and the name of the camera, and the name of the host computer to which the camera is connected, based on the ID, and notifies the camera control client 50 and the map control software 54 of information relating to the checked items.

Next, a description will be provided of an operation performed when controlling a camera. If an image display region displaying an image from a camera to be controlled (for example, an image display region 66c) from among the image display regions 66a-66f displaying images is subjected to single clicking according to the above-described operation, a state in which camera control can be performed is provided. At that time, a yellow frame is displayed on the image display region 66c, in order to indicate capability of camera control to the operator. The camera control panel 68 is also automatically displayed.

The camera control client 50 performs network connection to the camera control server 56 of the image transmission terminal 12 to which the selected camera is connected, based on information from the image reception software 52. Then, the camera control client 50 transmits a camera control signal provided based on the user's operation to the camera control server 56 subjected to network connection. The camera control server 56 controls the camera 16 in accordance with the received camera control signal, and notifies the camera control client 50 of the current information of the camera 16. The camera control client 50 notifies the image reception software 52 of the current information of the selected camera 16. The image reception software 52 also notifies the map control software 54 of that information.

Figure 9:
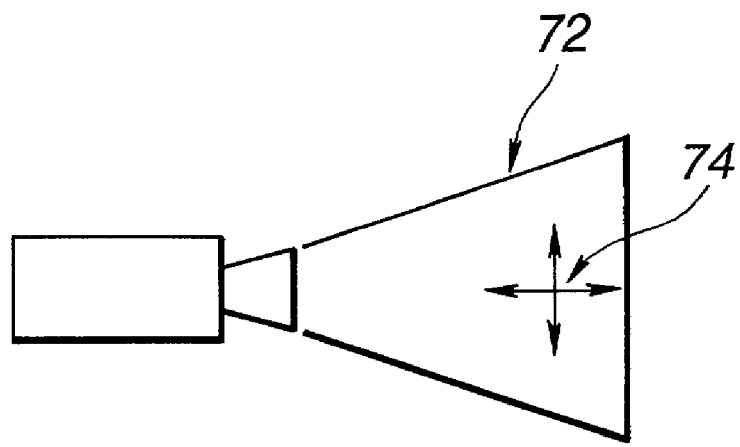
FIG. 9 is a diagram illustrating a camera icon being displayed.

The map control software 54 changes the direction of the camera icon so as to coincide with the direction of the corresponding camera 16, displays, as shown in FIG. 9, a scope 72 indicating that the image is being displayed for the selected camera icon, and also displays a control pointer 74 for controlling panning/tilting and zooming within the scope 72. As described above, changing information (particularly, panning/tilting information) of the camera 16 currently being displayed is always notified from the image reception software 52 to the map control software 54. The map control software 54 changes the direction of the selected one of the camera icons 62a-62f so as to coincide with the direction of the corresponding camera, based on the notified information.

A single camera control panel 68 may be provided commonly for the image display regions 66a-66f, or a plurality of camera control panels 68 may be provided for corresponding ones of the image display regions 66a-66f. When providing a plurality of camera control panels 68, by providing and displaying respective reference numerals for the image display regions 66a-66f, and providing and displaying the same reference numerals for the camera control panels 68, a system in which correspondence between images and camera control panels 68 can be easily understood is provided. Instead of providing and displaying reference numerals, a camera name provided for each camera may be displayed, or different colors may be provided and displayed for the image display regions 66a-66f.

Figure 10:
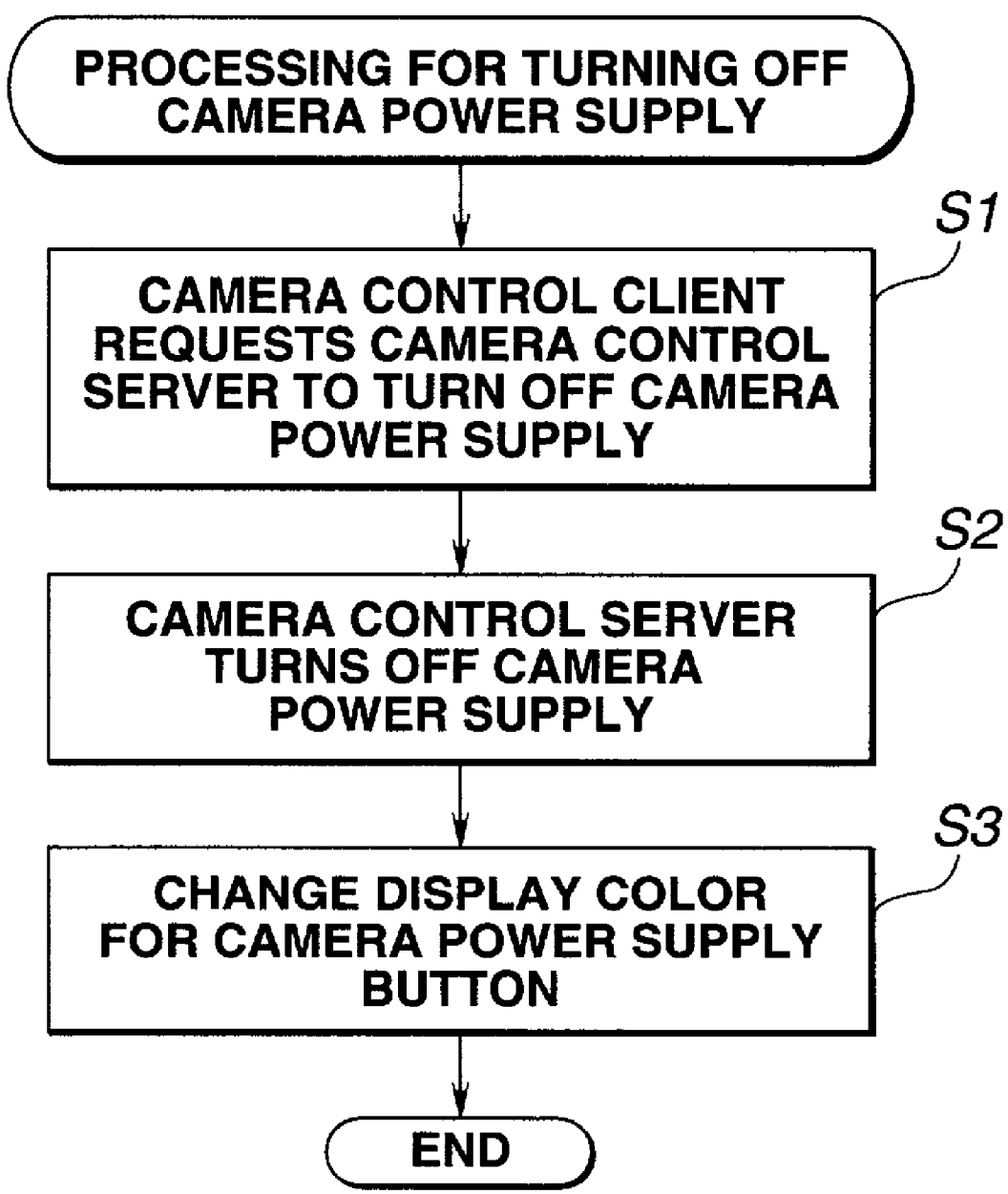
FIG. 10 is a flowchart illustrating processing for turning off a power supply.

FIG. 10 is a flowchart illustrating processing for turning off the power supply of an arbitrarily selected camera 16. When intending to temporarily turn off the power supply of the selected camera, an operation of selecting a camera icon indicating the camera whose power supply is to be turned off, and depressing a camera power supply button 70 of the camera control panel 68, is performed. The camera power supply button 70 is displayed with a different color and/or different characters (for example, "power supply off" or "power supply on") in accordance with the state of the power supply of the concerned camera. In accordance with the operation of the camera power supply button 70, the camera control client 52 notifies the camera control server 56 of the image transmission terminal 12 to which the corresponding camera 16 is connected of a request to turn off the camera power supply via the network 10 (step S1).

The camera control server 56 controls the camera control device 14 via the I/O board 34 in order to disconnect electric power supply to the corresponding video camera 10 (step S2). The camera power supply button 70 is changed to a display state indicating that the power supply is in an off-state (step S3). Thus, the operator is notified that the power supply of the corresponding camera is in an off-state.

When intending to resume electric power supply to the camera whose power supply is in an off-state, the operation of again depressing the camera power supply button 70 may be performed. Thus, a request to turn on the camera power supply is notified to the camera control server 56, and electric power is supplied to the corresponding video camera 16. At that time, the camera power supply button 70 is changed to a color indicating that the power supply is in an on-state.

Thus, it is possible to control electric power supply to an arbitrary camera from the monitoring terminal 18, and to reduce power consumption.

In response to a request to transmit an image from the image reception software 52, the image transmission software 58 transmits an image from an assigned camera. That is, the image reception software 52 requests the image transmission software 58 of the image transmission terminal 12 to which the selected camera is connected to transmit image data for one frame via the network 10. In response to this request, the image transmission software 58 compresses image data of the latest frame from the camera 16 and divides the compressed data into packets, and transmits the packets to the image reception software 52 which has requested data transmission. The image reception software 52 reconstructs frames from the received packets, expands the compressed data, displays the resultant data on an assigned region from among the image display regions 66a-66f, and again provides an image transmission request. By repeating such an operation, the image reception terminal 18 receives images from a remote camera, and displays the received images.

When intending to simultaneously display images from a plurality of cameras, provision of an image transmission request and reception/display of an image is repeatedly executed for the image transmission software 58 of the image transmission terminal 12 to which each camera is connected.

Figure 11:
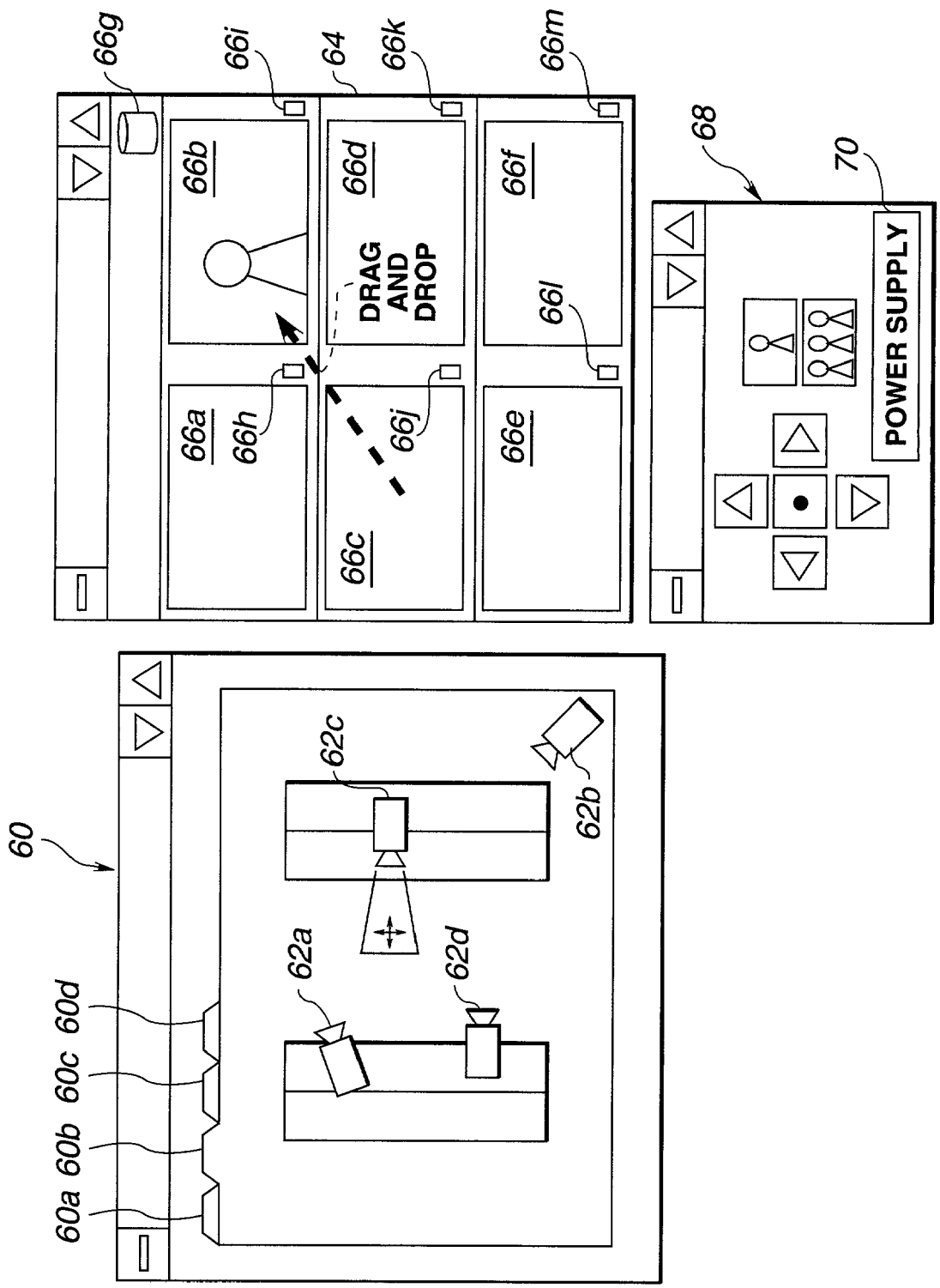
FIG. 11 is a diagram illustrating an operation for changing an image display region.

The position of the received image from a camera can be changed by a drag-and-drop operation. For example, when intending to change the image region from the image display region 66c to the image display region 66b, as shown in FIG. 11, the mouse button is depressed after moving the mouse pointer onto the image display region 66c. Then, the mouse pointer is moved onto the image display region 66b while depressing the mouse button, and the mouse button is released on the image display region 66b.

In accordance with such an operation, the image reception software 52 stops image display of the image display region which has originally been selected (the region 66c in the case of FIG. 11), and the image from the camera displayed on that image display region is allocated to the image display region which has subsequently been selected (the region 66c in the case of FIG. 11). Logical network connection is not disconnected by this operation.

In the summary mode, when intending to gaze at an image in a certain image display region (for example, the region 66a), this image display region is subjected to double clicking by the mouse. The image display window 64 is thereby switched to the gaze mode of gazing at this image. FIG. 13 illustrates the image display window 64 in the gaze mode. A window 80 is termed a gaze display window. A mode switching button 82 is used for returning to the summary mode. Camera control direction cursors 84a, 84b, 84c and 84d are used when performing camera control.

Figure 14:
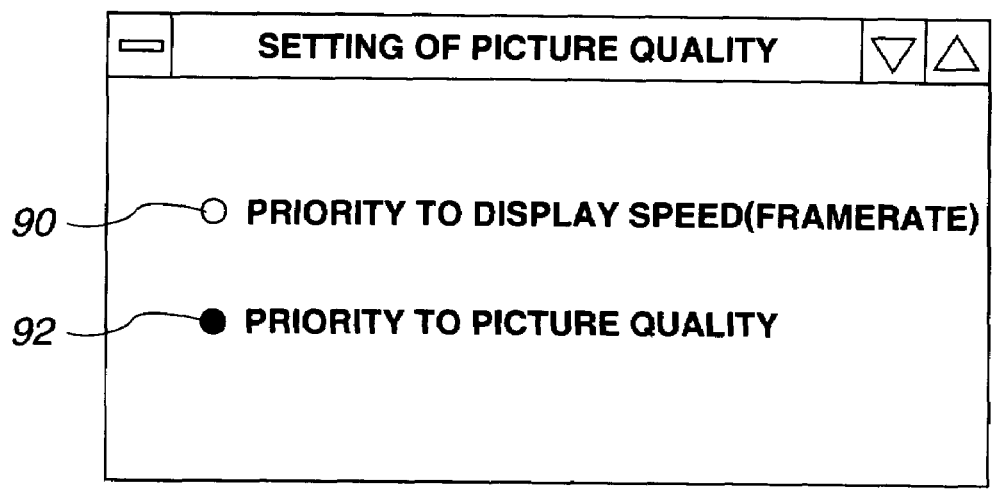
FIG. 14 is a diagram illustrating a panel for setting picture quality.

In the gaze mode, one image is displayed in a large size. At that time, it is possible to select one of display with smooth movement in which priority is given to the display speed (frame rate), and high-resolution display in which the amount of data per frame is increased by giving priority to the picture quality. FIG. 14 illustrates a window for setting the picture quality for performing such selection. In FIG. 14, reference numeral 90 represents a button for giving priority to the display speed, and reference numeral 92 represents a button for giving priority to the picture quality. Only one of the display-speed priority button 90 and the picture-quality priority button 92 can be selected.

Next, the operation performed when shifting to the gaze mode in a state in which the picture-quality priority button 92 is selected will be described in detail. First, the image reception software 52 notifies the image transmission software 58 of the corresponding image transmission terminal 12 of a request of high resolution via the network 10. Upon reception of the request of high resolution, the image transmission software 58 switches the resolution of an image to be transmitted to high resolution. The image reception software 52 receives the high-resolution image and displays the image on the gaze display window 80. At that time, since the high-resolution image has a larger amount of data than a basic-resolution image, the display speed is, in some cases, reduced.

By depressing the mode switching button 82 or performing double clicking of the gaze display window 80 with the mouse, the image display window 64 returns to the summary mode. The image reception software 52 notifies the image transmission software 58 of the corresponding image transmission terminal 12 of a request of basic resolution via the network 10. Upon reception of the request of basic resolution, the image transmission software 58 returns the resolution of an image to be transmitted to basic resolution.

Next, a description will be provided of the operation performed when shifting to the gaze mode in a state in which the display-speed priority button 90 is selected. In this case, the image reception software 52 notifies the image transmission software 58 of nothing. The image reception software 52 performs magnified display of the image transmitted with basic resolution on the gaze display window 80. The operation for returning to the summary mode is the same as when the picture-quality priority button 92 is selected.

Although in the foregoing description, mode switching is performed by controlling the resolution of the image, the compression ratio or the transfer rate of the image may also be controlled.

Next, a description will be provided of the operation performed when controlling a camera in the gaze mode. In the gaze mode, as in the summary mode, the movement of the camera can be controlled using the camera control panel 68. In addition, by continuing to depress the button of the mouse within the gaze display window, the camera can be controlled. In FIG. 13, the mouse cursor changes to one of the camera direction control cursors 84a-84d as the mouse cursor is positioned at the corresponding one of four regions divided by four broken lines in the gaze display window 80. Furthermore, by depressing the button of the mouse in each region, the camera is controlled in one of the four directions, i.e., upward, downward, rightward and leftward directions.

In accordance with an instruction to change to the gaze mode, communication with terminals other than the image transmission terminal assigned in the gaze mode may be interrupted, and the mode may be shifted to a picture-quality priority mode or a display-speed priority mode.

As a result, in the gaze mode, by allocating a wide network to the assigned terminal and performing communication of a high-resolution image or an image having a high frame rate using the allocated network, the picture quality can be improved.

Figure 12:
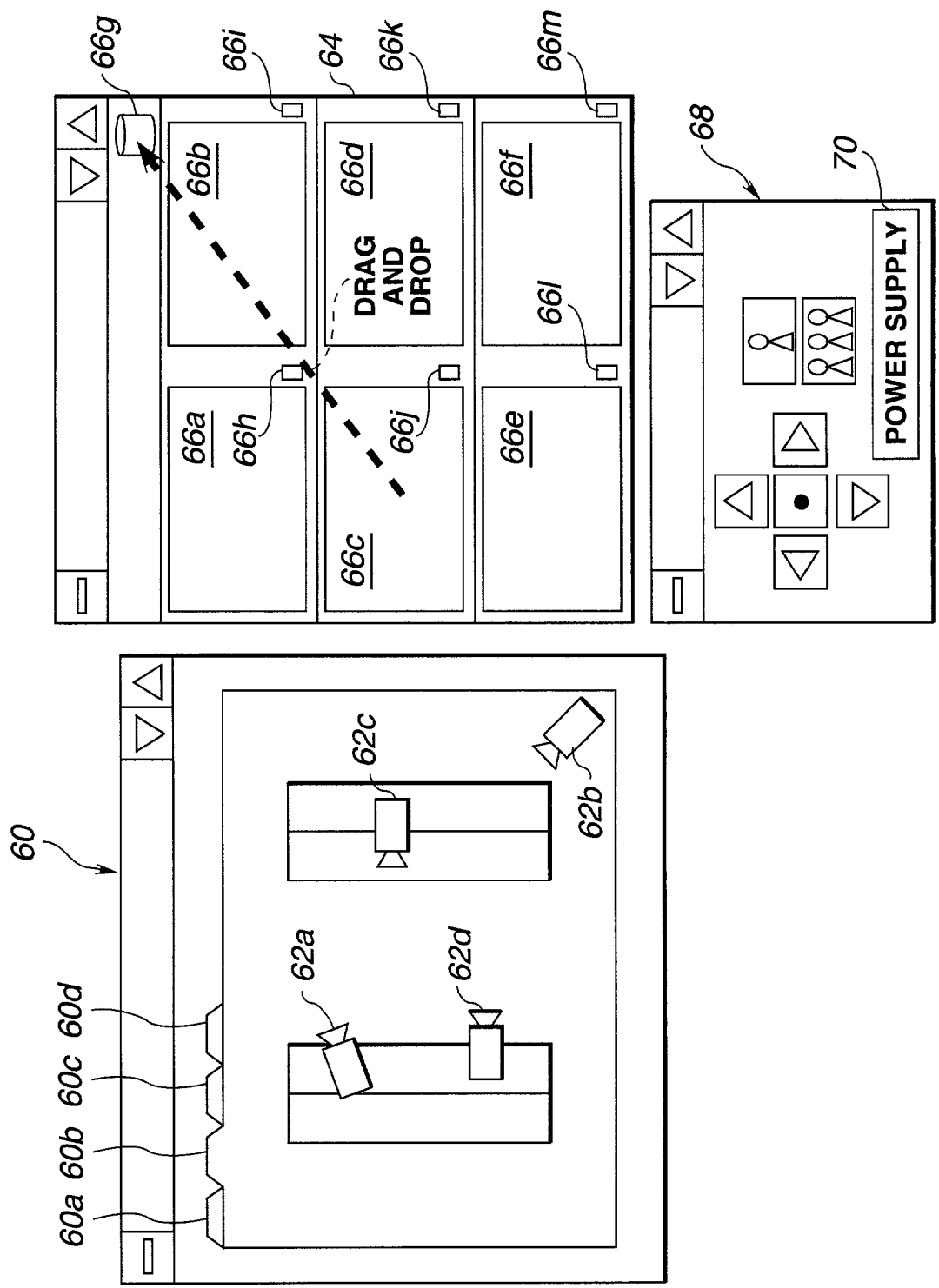
FIG. 12 is a diagram illustrating an operation for interrupting image display.

When intending to interrupt image display, an operation of putting an image to be displayed on the image display region to be interrupted into the trash bin icon 66g may be performed. FIG. 12 illustrates a case in which display of an image displayed on the image display region 66c is interrupted. The mouse button is depressed after moving the mouse pointer onto the image display region 66c, the mouse pointer is moved onto the trash bin icon 66g while depressing the mouse button, and the mouse button is released on the trash bin icon 66g.

In accordance with such an operation, the image reception software 54 interrupts provision of a request of image transmission to the image transmission software 58 of the image transmission terminal to which the camera providing the image displayed on the selected image display region (the region 66c in the case of FIG. 12) is connected. In addition, the image reception software 54 notifies the camera control client 50 and the map control software 54 of interruption of image display. In response to this notification, the camera control client 50 disconnects network connection with the camera control server 56 of the corresponding image transmission terminal 12 in order to clear the concerned image display region (the region 66c in the case of FIG. 12). The map control software 54 erases scope display of the camera icon of the corresponding camera (for example, the icon 62c), to update the map.

In FIG. 7, the image from the camera represented by the camera icon 62c is displayed on the image display region 66c, and an image information display region 66j corresponding to the region 66c also displays image information. The image information displayed at that time is an icon as that shown in FIG. 15. The icon flashes every time an image for one frame is transmitted from the camera 16 corresponding to the image display region 66c. Instead of displaying only the image information display region 66j corresponding to the assigned image display region 66c, image information display regions 66h-66m corresponding to all the image display regions 66a-66f performing image display may be displayed. The displayed image information is not limited to the icon shown in FIG. 15. For example, numerical information or character information indicating the frame rate or the like may also be displayed. The image information can be displayed not only in the summary mode, but also, of course, in the above-described gaze mode.

Figure 16:
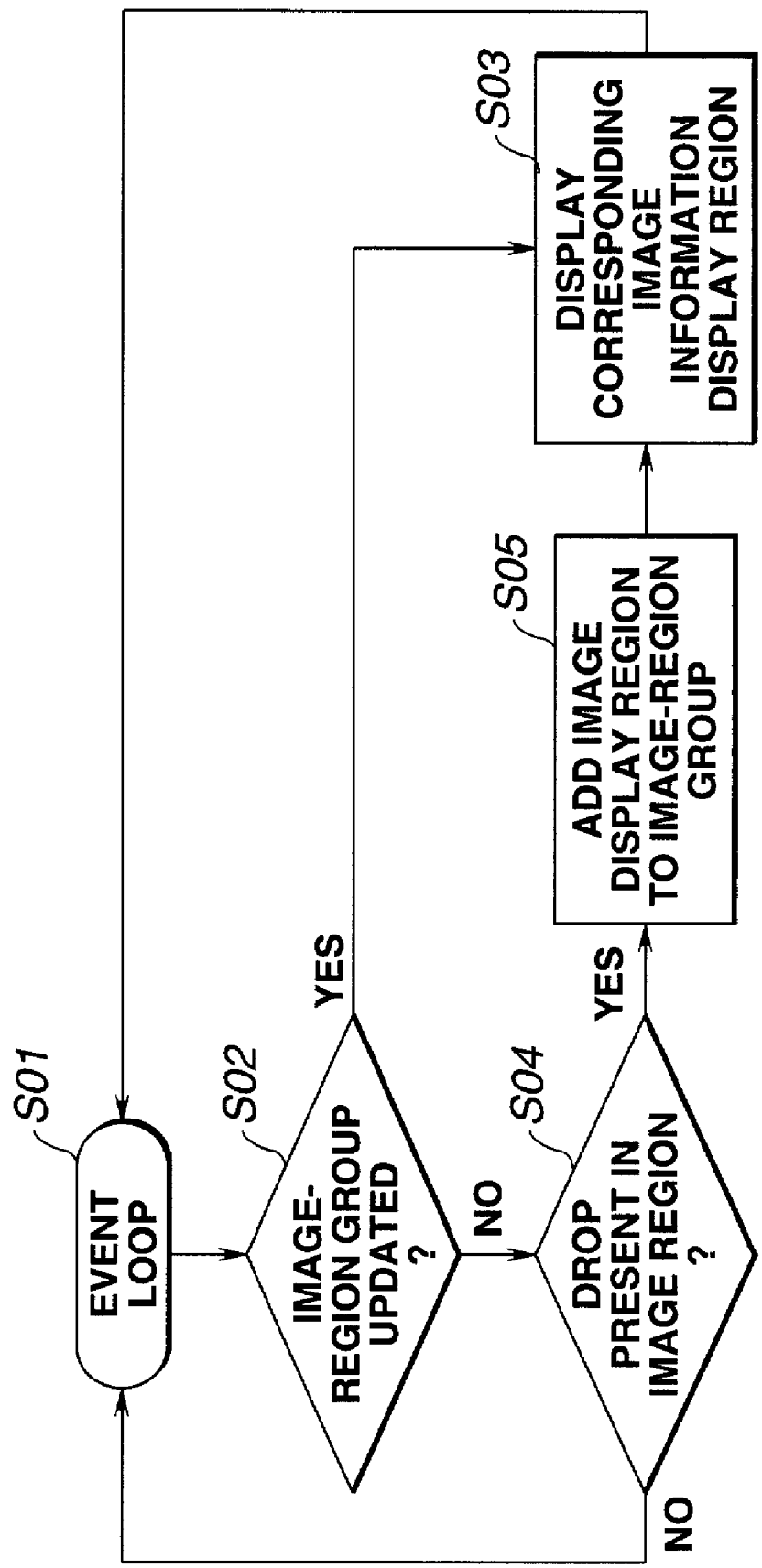
FIG. 16 is a flowchart illustrating image information display processing.

FIG. 16 is a flowchart illustrating processing for displaying image information. Image processing is realized, for example, by an event loop (step S01). When there is a displayed image-region group, every time an image for one frame is transmitted from the corresponding camera 16 and the image display region is updated in each of the image regions 66a-66f (step S02), the corresponding image information display region is displayed (step S03). Flashing of an icon can be realized according to a conventional ordinary procedure. When the image from the camera represented by the camera icon 62c is dragged onto the image display region 66c (step S04), the image display region 66c is added to the displayed image-region group (step S05), and the corresponding image information region 66j is displayed (step S03).

In the first embodiment, by performing a drag-and-drop operation of the camera symbol on the map onto the image display region, logic network connection between the image reception terminal and the image transmission terminal can be established. By performing a drag-and-drop operation between the image display region displaying the image from the camera and another arbitrary image display region, the position of image display can be changed. By performing a drag-and-drop operation from the image display region displaying the image from the camera to a symbol representing interrution of display, image display can be interrupted. Thus, start of display of the image from the camera, a change in the display position, and interruption of display can be very simply operated. The image is not limited to an image from a camera, but may, of course, also be an image generated from a storage medium, such as a video tape or the like.

By flashing the icon every time the image from the camera is updated in the image information display region, the property to confirm that even an image having little movement (image difference) is normally received and is operating can be easily improved.

A case in which the image information display regions 66h-66m are always displayed has been described. However, by taking into consideration that, when the frame rate is high, flashing of the icon is, in some cases, a nuisance, and reception of an image can be easily confirmed by seeing the image, dislay may be performed in the image information display region only when the frame rate is low and there is the possibility that the operator erroneously finds some kind of abnormality.

A second embodiment of the present invention will now be described.

Figure 17:
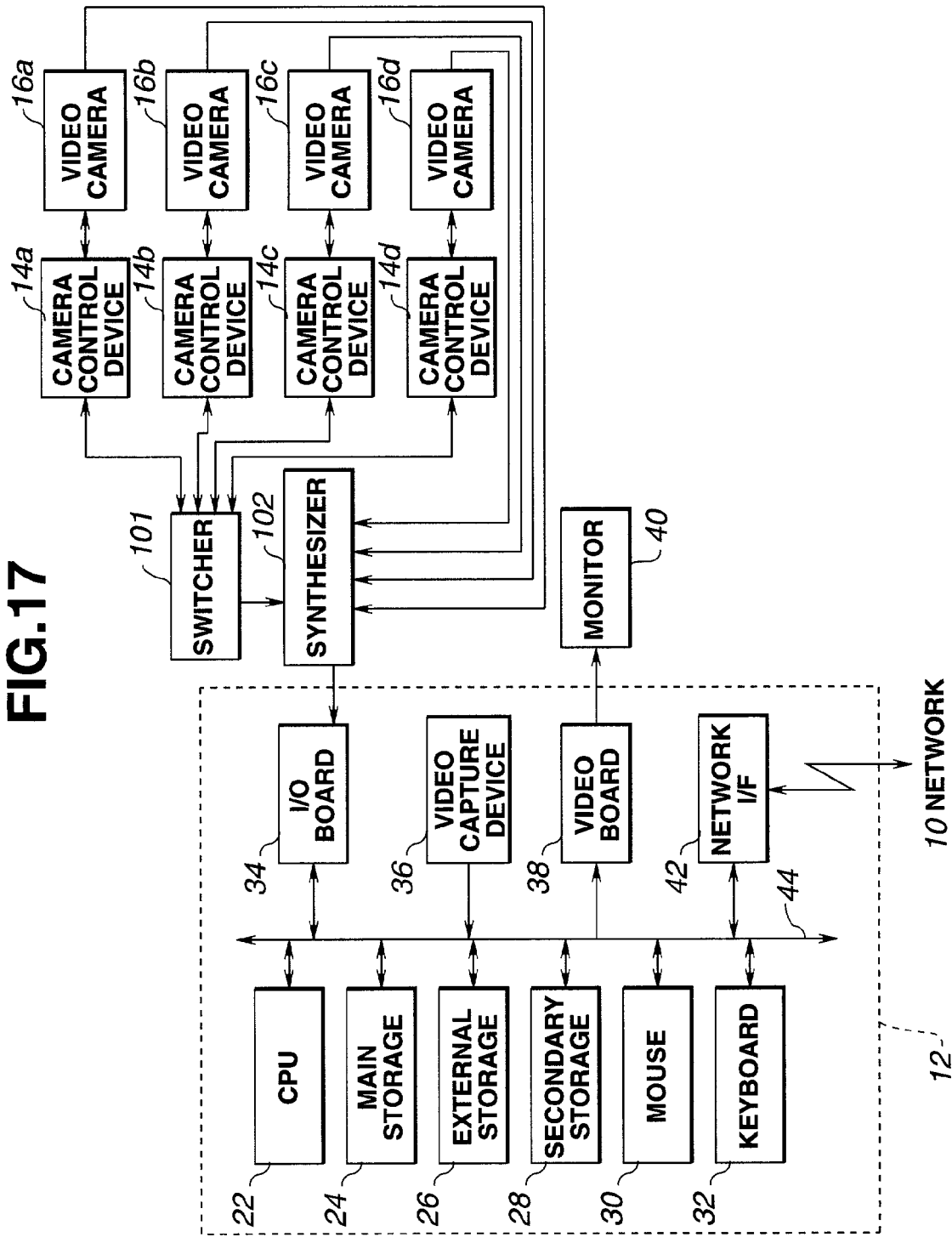
FIG. 17 is a schematic block diagram illustrating the configuration of the image transmission terminal 12 to which a plurality of video cameras are connected via a synthesizer and a switcher, according to a second embodiment of the present invention.

FIG. 17 is a schematic block diagram illustrating the configuration of an image transmission terminal to which a switcher and a synthesizer are connected. In FIG. 17, components having the same configurations as those shown in FIG. 2 are indicated by the same reference numerals, and further description thereof will be omitted.

In FIG. 2, a video camera is connected to each computer. In FIG. 17, however, four camera control devices 14a-14d and four video cameras 16a-16d are connected to a computer via a switcher 101 and a synthesizer 102.

First, the synthesizer 102 will be described. The synthesizer 102 performs image synthesis of analog moving signals from the video cameras 16a-16d as represented by a frame 66a shown in FIG. 18. Furthermore, by transmitting a command from the computer to the synthesizer 102 via the switcher 101, a moving signal from a video camera can be selectively displayed as indicated by a frame 66a shown in FIG. 19.

Next, the switcher 101 will be described. In FIG. 17, in contrast to FIG. 2, the four camera control devices are connected. When controlling a video camera, the computer must perform switching of the camera control devices 14a-14d. The switcher 101 is used for such switching. As described above, by transmitting a command to the synthesizer 102, it is possible to select one of moving signals from the video cameras, or synthesize and display the moving signals.

When controlling the video camera 16 via the switcher 101 as shown in FIG. 17, the camera control server 56 shown in FIG. 4 transmits a command for selecting a video camera to be controlled to the switcher 101, in order to perform switching to the corresponding camera control device. Then, in accordance with a request from the camera control client 50 shown in FIG. 4, the video camera is controlled via the switcher 101 and the camera control device 14 as in the first embodiment.

Figure 18:
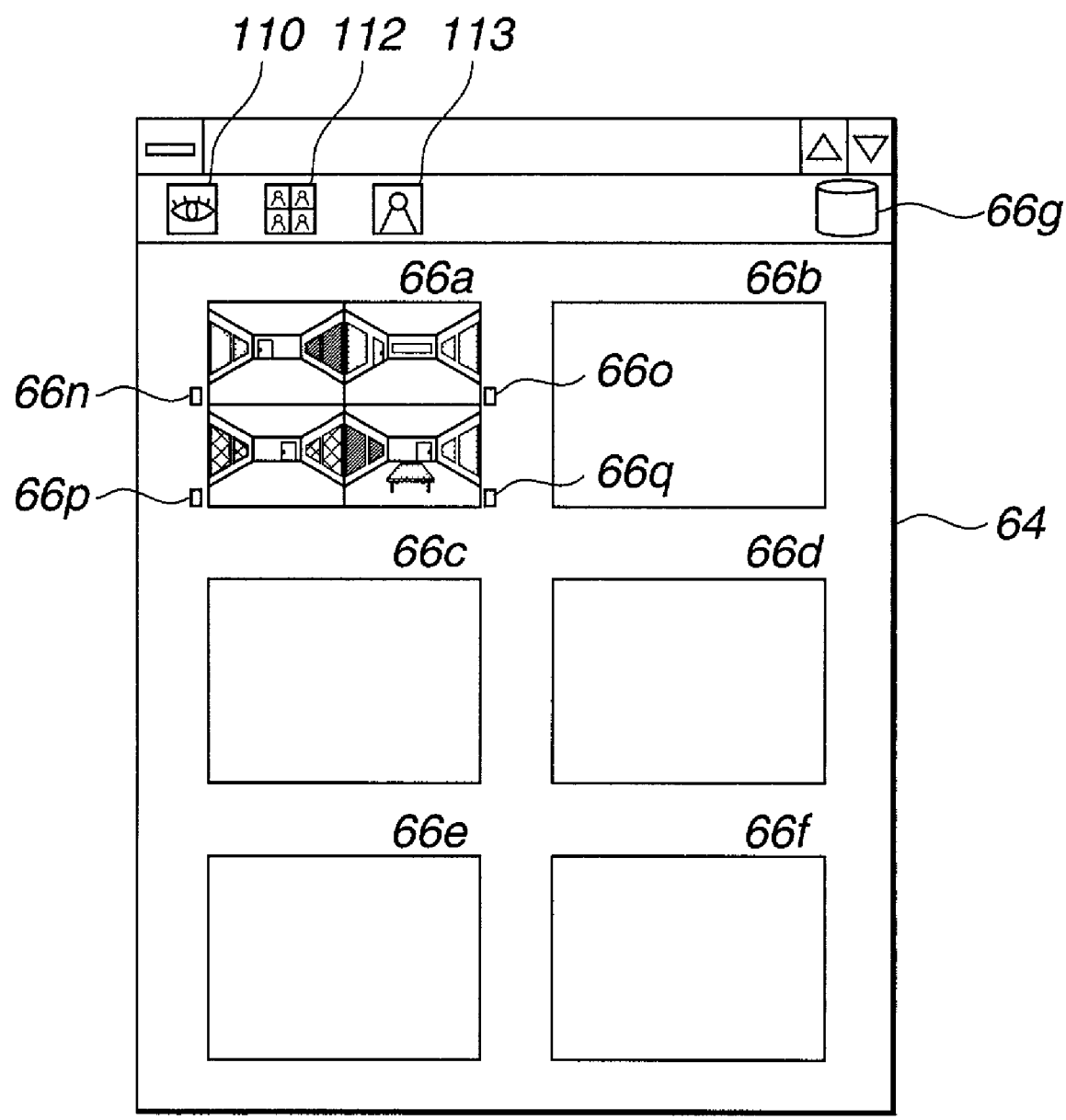
FIG. 18 is a diagram illustrating a picture surface in a summary image mode when images from the image transmission terminal 12 to which the plurality of video cameras are connected via the synthesizer and the switcher are synthesized and displayed.

FIG. 18 shows an example of the contents of display on the monitor of the image reception terminal 18 in the second embodiment.

In FIG. 18, reference numeral 110 represents a single image display mode button. When this button is clicked, as represented by a frame 111 shown in FIG. 20, a window is newly popped up, and only the selected image is displayed in the form of moving images. According to an instruction through the single image display mode button, a command to interrupt image communication with terminals other than the image transmission terminal transmitting the assigned image is transmitted to the terminals other than the image transmission terminal transmitting the assigned image, a command for improvement in the frame rate in order to efficiently utilize an avaiable network capacity provided due to interruption of image communication, or a command for improvement in resolution is transmitted to the image transmission terminal transmitting the assigned image.

It is determined by initial setting by the user whether a command for improvement in the frame rate or a command for improvement in resolution is to be transmitted according to an instruction through the single image display mode button.

In FIG. 18, there are also shown a four-image silmultaneous display button 112 and a selection display button 113. These buttons become effective only when an image from the image transmission terminal to which the four video cameras are connected is selected by the synthesizer and the switcher shown in FIG. 17. Suppose that the image displayed in the frame 66a of the image display window 64 is an image from the image transmission terminal shown in FIG. 17. By selecting the frame 66a by the mouse, the four-image simultaneous display button 112 and the selection display button 113 become effective.

Figure 19:
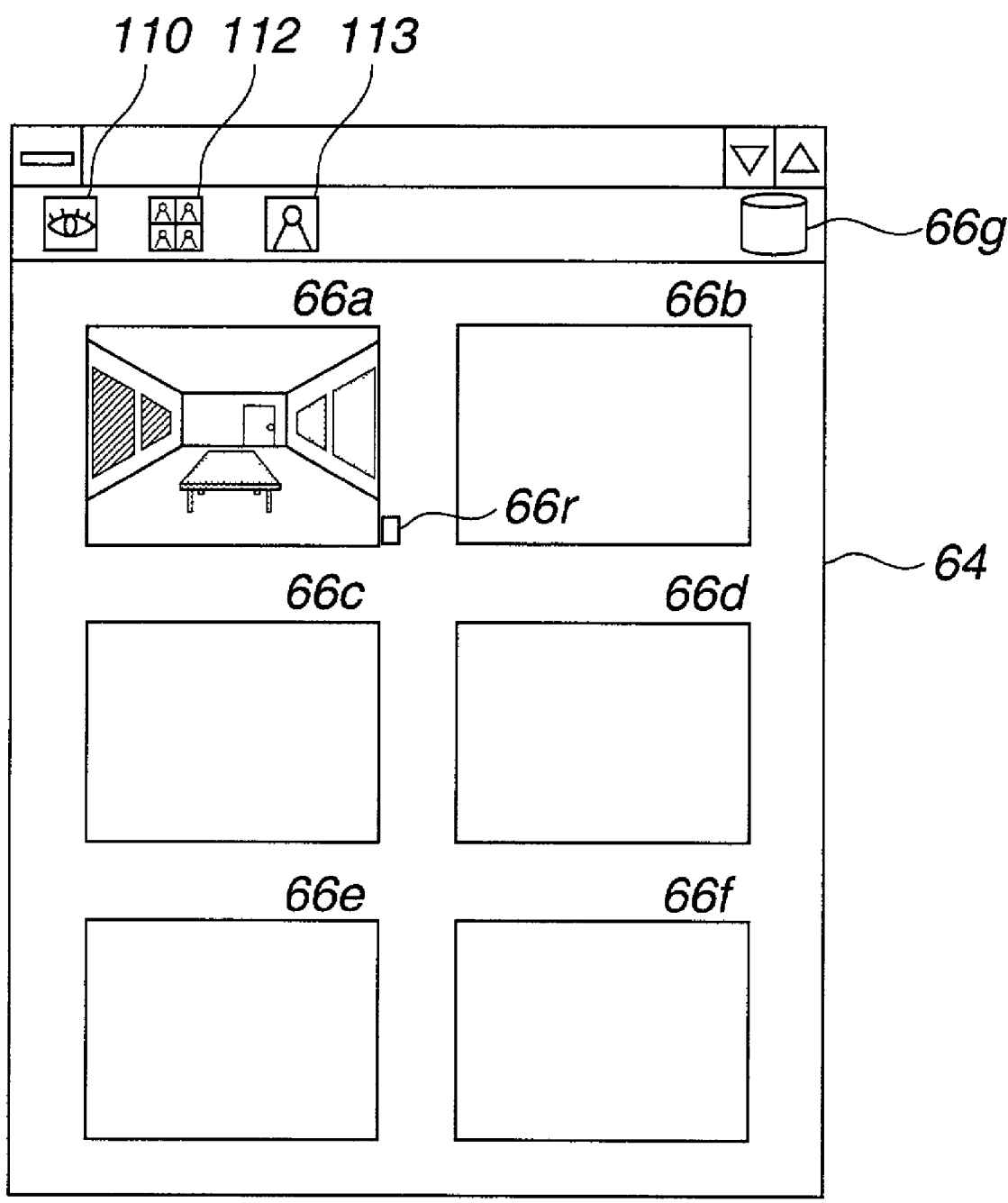
FIG. 19 is a diagram illustrating a picture surface in a summary image mode when only one image is selected and displayed from among images from the image transmission terminal 12 to which the plurality of video cameras are connected via the synthesizer and the switcher.

For example, when four images are simultaneously displayed as shown in FIG. 18, the lower right image is clicked from among the four displayed images. By then clicking the selection display button 113, an image as shown in FIG. 19 is obtained. By clicking the frame 66a in a state of display as shown in FIG. 19, and then clicking the four-image simultaneous display button 112, a state as shown in FIG. 18 is obtained.

Figure 20:
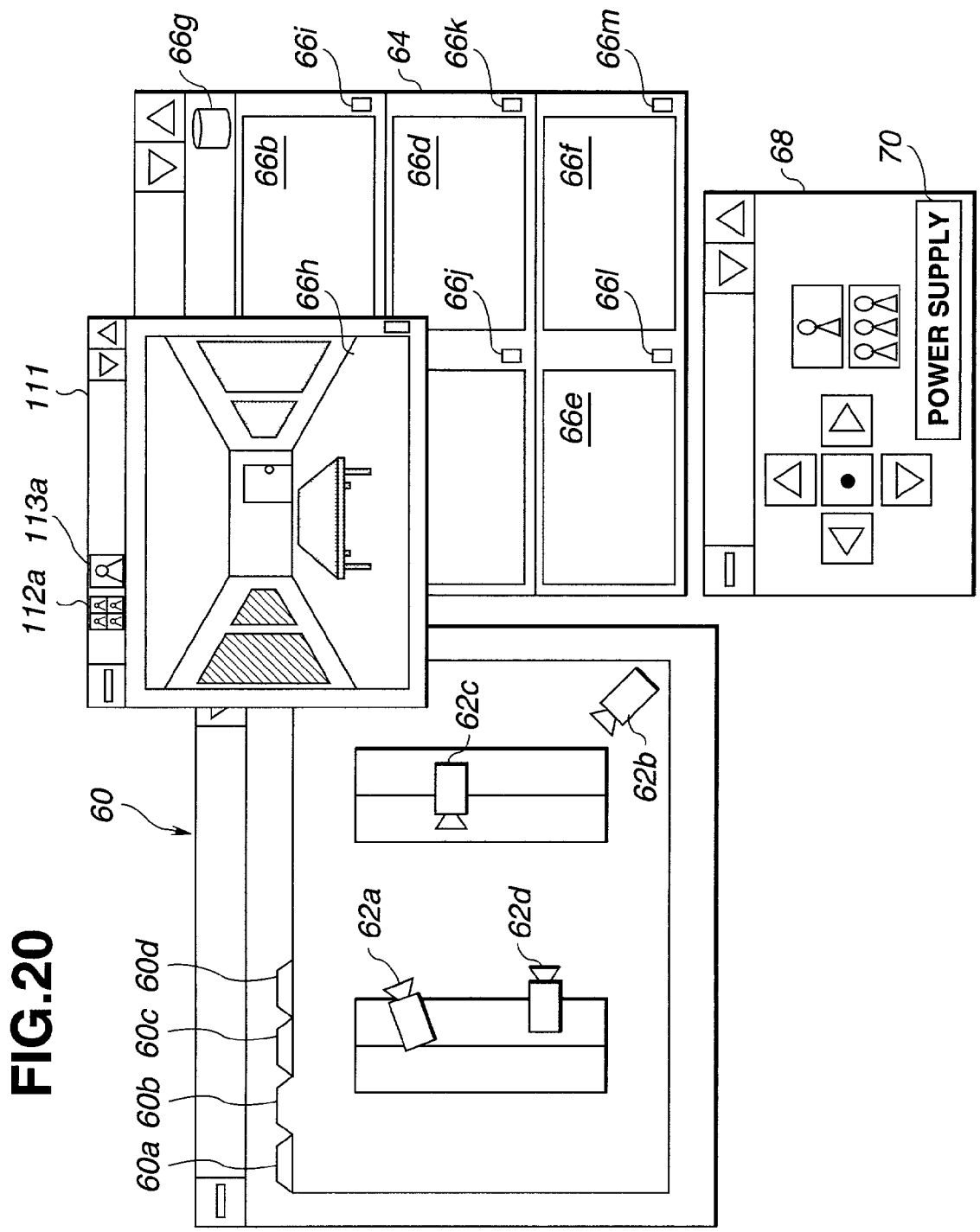
FIG. 20 is a diagram illustrating a picture surface when a single image display window is popped up.

Next, the operation performed in the single image display mode will be described. By clicking the single image display mode button after assigning one of the image display regions 66a-66f using the mouse 30, the single image display window 111 is popped up as shown in FIG. 20, and the selected image is displayed.

A case of providing the single image display mode for an image from the image transmission terminal to which the four video cameras are connected via the synthesizer and the switcher as shown in FIG. 17 will now be considered. An image displayed in the frame 66a shown in FIG. 18 or 19 is an image from the image transmission terminal.

Figure 21:
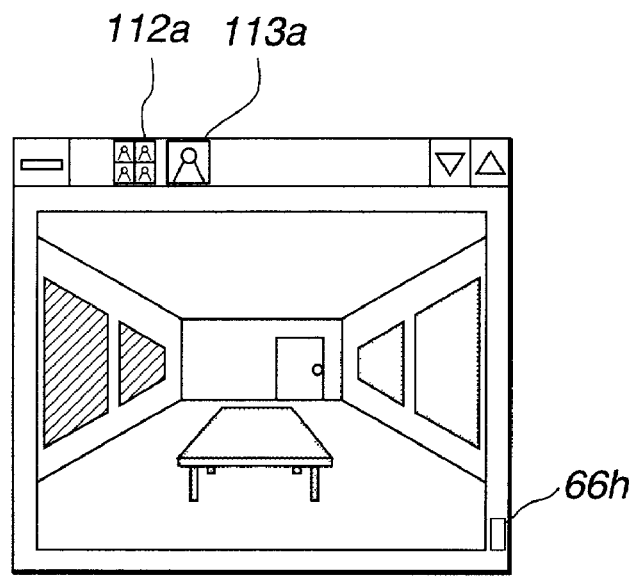
FIG. 21 is a diagram illustrating a picture surface in a single-image display mode when only one image is selected and displayed from among images from the image transmission terminal 12 to which the plurality of video cameras are connected via the synthesizer and the switcher.
Figure 22:
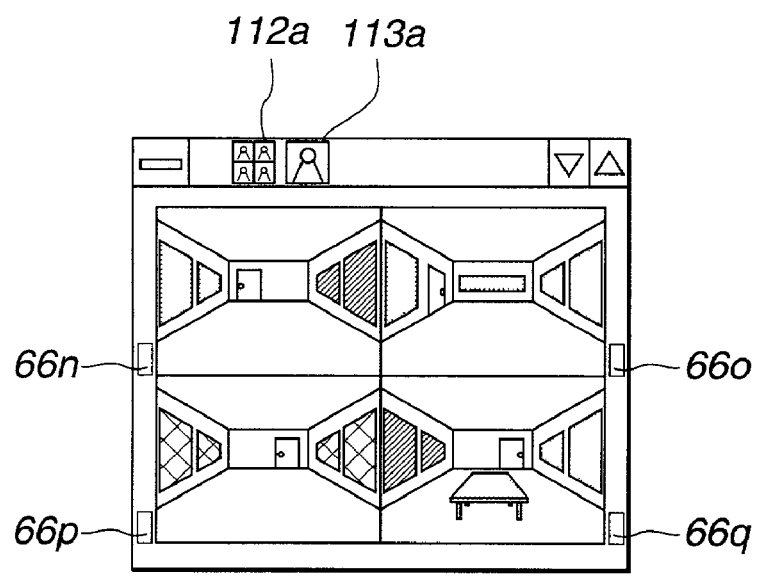
FIG. 22 is a diagram illustrating a picture surface in a single-image display mode when images from the image transmission terminal 12 to which the plurality of video cameras are connected via the synthesizer and the switcher are synthesized and displayed.

When display as shown in FIG. 18 is performed, if the single image display mode button 10 is clicked, the single image display window 111 as shown in FIG. 22 is popped up. Since this is an image from the image transmission terminal to which the four video cameras are connected via the synthesizer and the switcher, a four-image simultaneous display button 112a and a selection display button 113a also appear on the single image display window 111. In this case, by clicking the selection display button 113a after clicking the lower right image shown in FIG. 22 by the mouse, an image as shown in FIG. 21 is displayed.

As for display shown in FIG. 21, also, in accordance with a command for improvement in the frame rate or a command for improvement in resolution as in the above-described case of image change to the single image display mode, a visually excellent image is displayed.

When display as shown in FIG. 19 is performed, if the single image display mode button 110 is clicked, the single image display window 111 as shown in FIG. 21 is popped up. Since this is an image from the image transmission terminal to which the four video cameras are connected via the synthesizer and the switcher, the four-image simultaneous display button 112a and the selection display button 113a also appear on the single image display window 111. In this state, by clicking the four-image simultaneous display button 112a by the mouse, a frame where four images are simultaneously displayed appears as shown in FIG. 22.

In the second embodiment, even in the simple image display mode, it is possible to perform synthesis display or selective display of images from the image transmission terminal to which the four video cameras are connected via the synthesizer and the switcher. Hence, it is possible to perform synthesis display or selective display of images without being aware of whether the current mode is the single image display mode or the summary image display mode.

Figure 15:
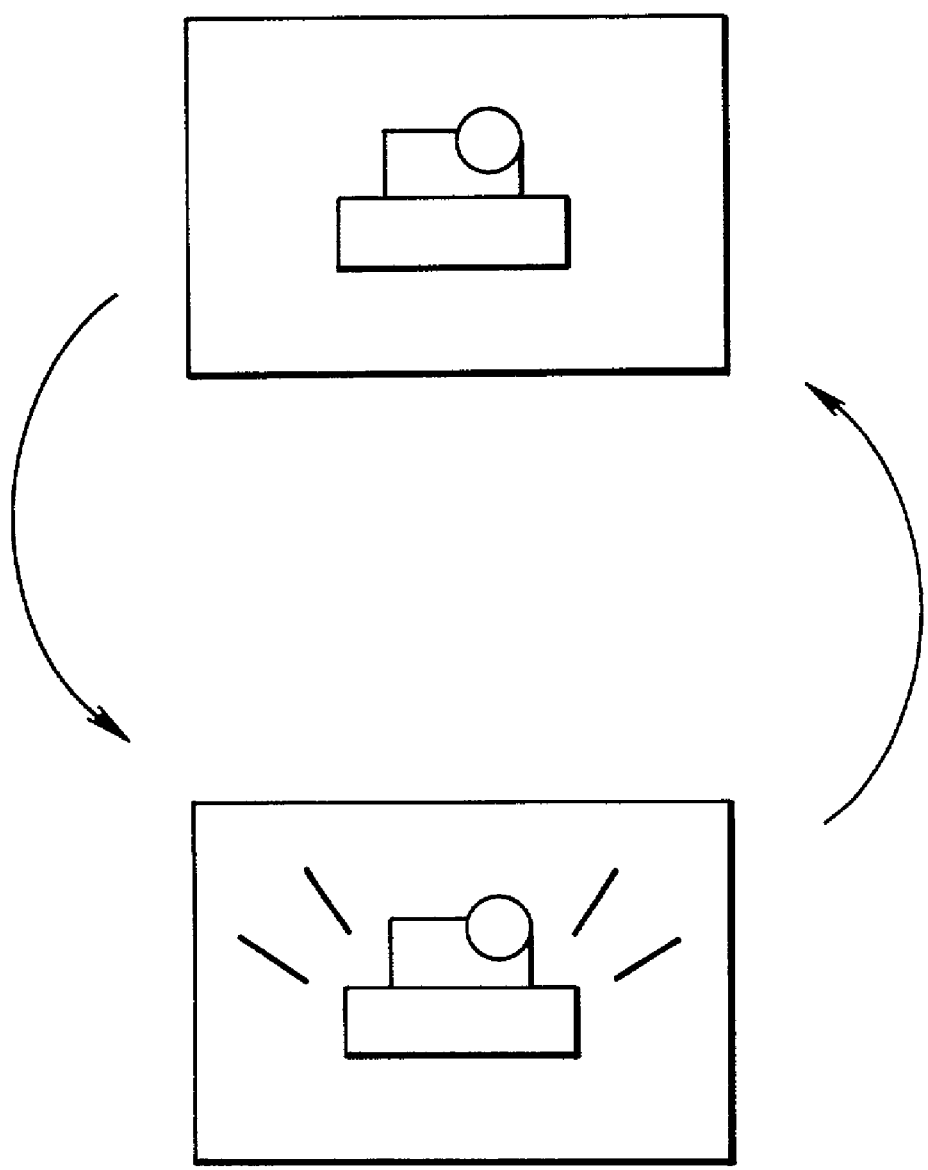
FIG. 15 is a diagram illustrating actual display in an image information display region.

When the image displayed on frame 66a of the image display window 64 comprises four simultaneously displayed images shown in FIG. 18 from the image transmission terminal including the switcher 101 as shown in FIG. 17, image information in image information display regions 66n-66q corresponding to the cameras 16a-16d, respectively, is also displayed. Each displayed image information at that time is an icon as shown in FIG. 15, which flashes every time an image for one frame from one of the cameras 16a-16d corresponding to the image display region 66a is transmitted. Instead of displaying only the image information display region from among the image information display regions 66m-66q corresponding to the assigned image display region 66a, image information display regions 66h-66q corresponding to all the image display regions 66a-66m performing image display may be displayed, as in the first embodiment. The displayed image information is not limited to the icon shown in FIG. 15. For example, numerical information or character information indicating the frame rate or the like may also be displayed. The image information is displayed not only in the summary mode, but also, of course, in the above-described gaze mode.

When the image displayed in the frame 66a of the image display window 64 is a selected image shown in FIG. 19 from the image transmission terminal including the switcher 101 as shown in FIG. 17, image information in an image information display region 66r corresponding to one of the cameras 16a-16d is also displayed. Each displayed image information at that time is an icon as shown in FIG. 15, which flashes every time an image for one frame from one of the cameras 16a-16d corresponding to the image display region 66a is transmitted. Instead of displaying only the image information display region 66r corresponding to the assigned image display region 66a, image information display regions 66h-66r corresponding to all the image display regions 66a-66m performing image display may be displayed, as in the above-described case. The displayed image information is not limited to the icon shown in FIG. 15. For example, numerical information or character information indicating the frame rate or the like may also be displayed. The image information is displayed not only in the summary mode, but also, of course, in the above-described gaze mode.

When simultaneously displaying four images, also, a signal from the synthesizer 102 may be considered to represent an image for one frame, and four images may be displayed on only one image display region 66q. At that time, the image display regions 66n-66p become unnecessary (not shown).

FIG. 16 is a flowchart illustrating processing for displaying image information. Image processing is realized, for example, by an event loop (step S01). When there is a displayed image-region group, every time an image for one frame is transmitted from the corresponding camera 16 and the image display region is updated in each of the image regions 66a-66f (step S02), the corresponding image information display region is displayed (step S03). Flashing of an icon can be realized according to a conventional ordinary procedure. When the image from the camera represented by the camera icon 62c is dragged onto the image display region 66c (step S04), the image display region 66c is added to the displayed image-region group (step S05), and the corresponding image information region 66j is displayed (step S03).

Next, a description will be provided of processing for automatically turning off the power supply of the camera during switcher connection.

The processing for turning off the camera power supply shown in the flowchart of FIG. 10 is executed by depressing the camera power supply button 70 of the camera control panel 68. A flowchart shown in FIG. 23 illustrates an example of processing for automatically turning off the power supply of the camera 16 which becomes not displayed on the image display window 64 when switching the camera 16.

When display as shown in FIG. 18 is performed, if the selection display button 113 is clicked, then, as shown in FIG. 19, an image from a camera selected from the four cameras 16a-16d connected via the switcher 101 is displayed on the image display region 66a (step S11). Then, the camera control client 52 notifies the camera control server 56 of the image transmission terminal 12 to which the selected camera is connected via the network 10 of a request to turn off the camera power supply (step S12). The camera control server 56 controls the switcher 101 via the I/O board 34 in order to disconnect electric power supply to non-selected cameras (step S13).

Figure 24:
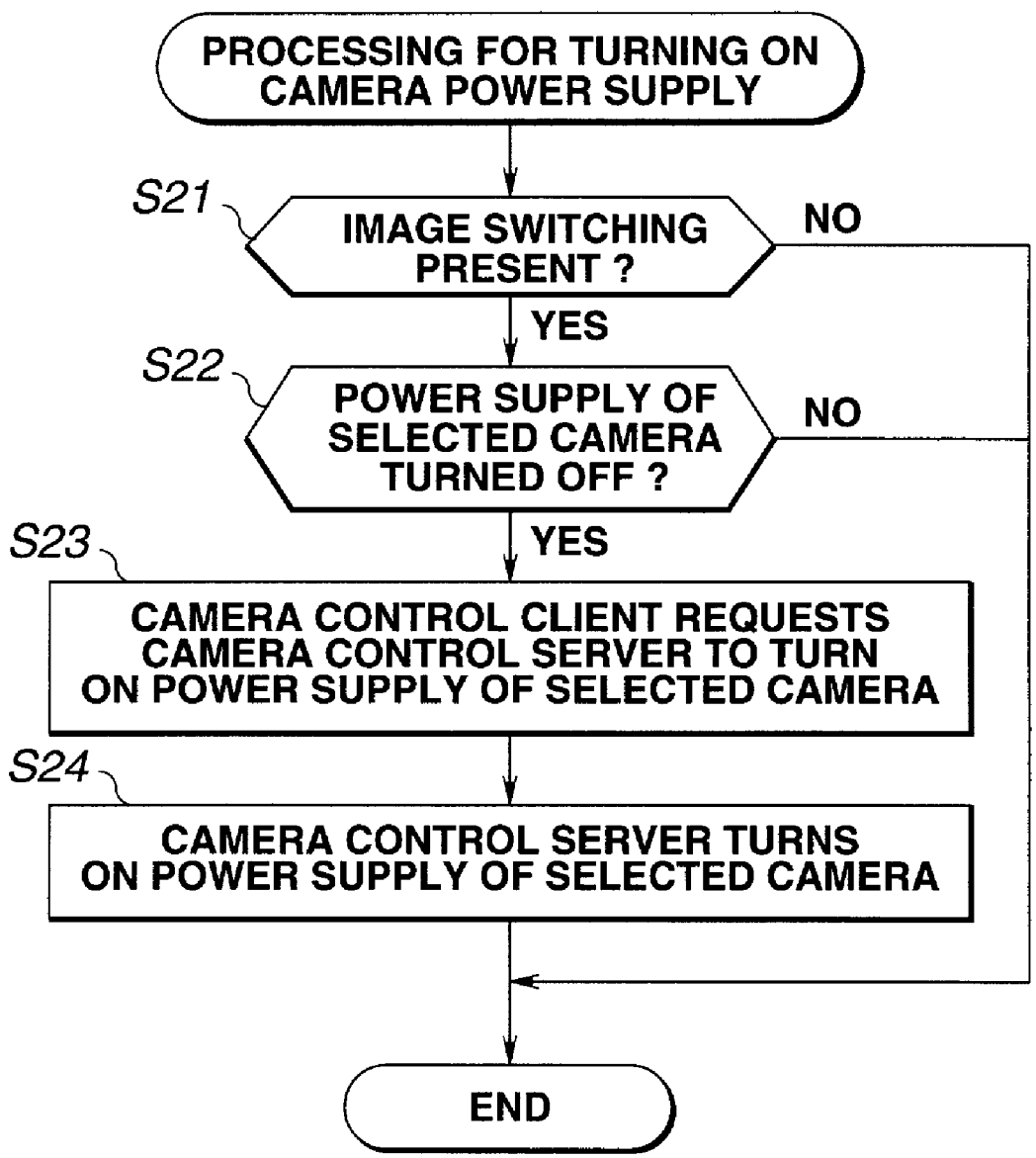
FIG. 24 is a flowchart illustrating processing for turning on the camera power supply during switcher connection.

Next, a description will be provided of processing for automatically turning off the power supply of the camera during switcher connection with reference to the flowchart shown in FIG. 24.

Figure 23:
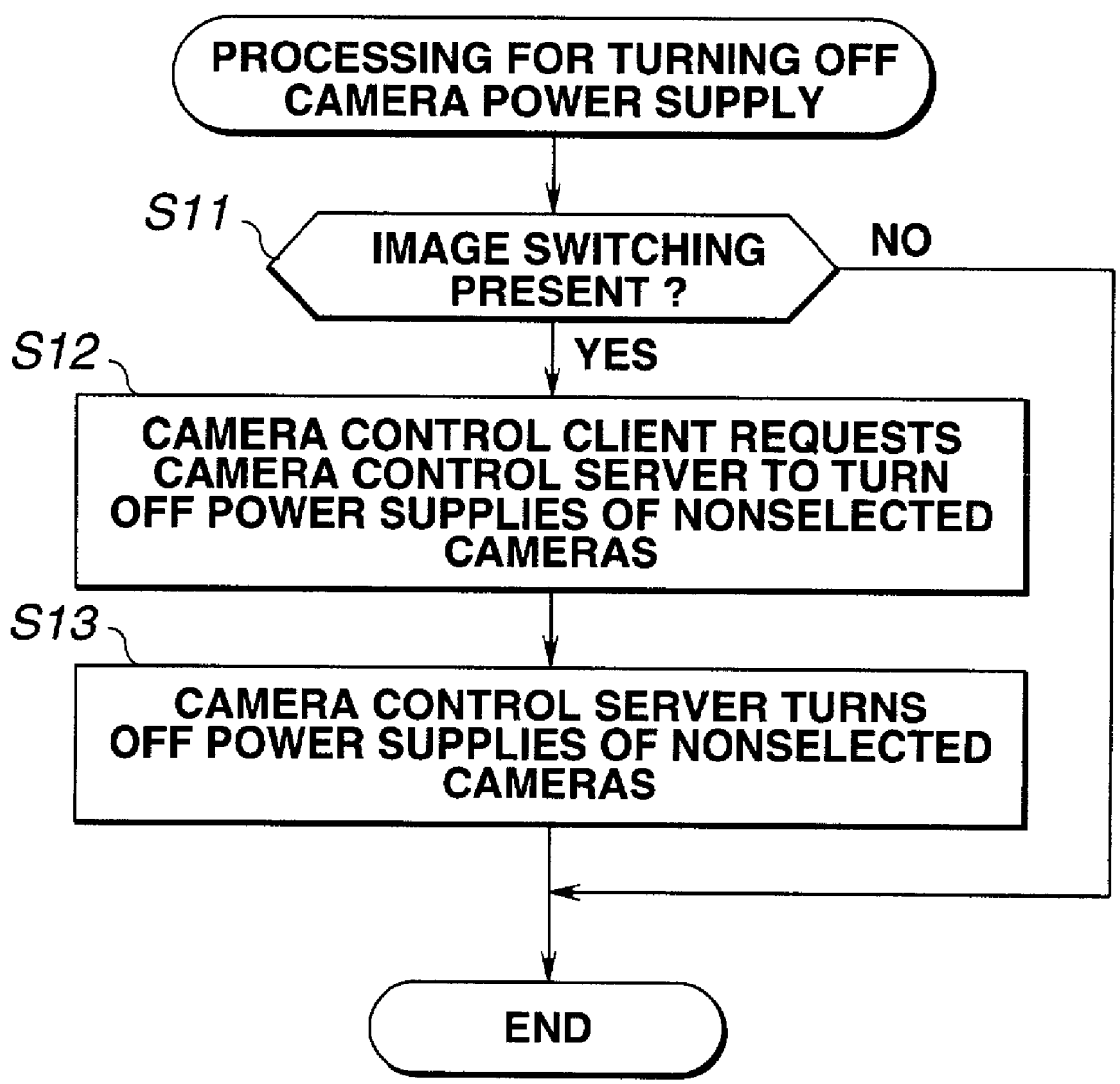
FIG. 23 is a flowchart illustrating processing for turning off a camera power supply during switcher connection.

As in the case shown in FIG. 23, when image switching is present (step S21), it is determined if the power supply of the selected camera 16 is turned off (step S22). If the result of the determination in step S22 is affirmative, the camera control client 52 notifies the camera control server 56 of the image transmission terminal 12 to which the selected camera 16 is connected via the network 10 of a request to turn off the power supply of the selected camera (step S23). The camera control server 56 controls the switcher 101 via the I/O board 34 in order to supply the selected camera 16 with electric power (step S24).

According to the above-described configuration, it is possible to control electric power supply to non-selected cameras 16 from the monitoring terminal 18 via the switcher 101, and thereby to reduce electric power consumption.

When the image displayed on the frame 66a of the image display window 64 comprises four simultaneously displayed images shown in FIG. 18 from the image transmission terminal including the switcher 101 as shown in FIG. 17, image information in image information display regions 66n-66q corresponding to the cameras 16a-16d, respectively, is also displayed. Each displayed image information at that time is an icon as shown in FIG. 15, which flashes every time an image for one frame from one of the cameras 16a-16d corresponding to the image display region 66a is transmitted. Instead of displaying only the image information display region from among the image information display regions 66m-66q corresponding to the assigned image display region 66a, image information display regions 66h-66q corresponding to all the image display regions 66a-66m performing image display may be displayed, as in the first embodiment. The displayed image information is not limited to the icon shown in FIG. 15. For example, numerical information or character information indicating the frame rate or the like may also be displayed. The image information is displayed not only in the summary mode, but also, of course, in the above-described gaze mode.

When the image displayed in the frame 66a of the image display window 64 is a selected image shown in FIG. 19 from the image transmission terminal including the switcher 101 as shown in FIG. 17, image information in an image information display region 66r corresponding to one of the cameras 16a-16d is also displayed. Each displayed image information at that time is an icon as shown in FIG. 15, which flashes every time an image for one frame from one of the cameras 16a-16d corresponding to the image display region 66a is transmitted. Instead of displaying only the image information display region 66r corresponding to the assigned image display region 66a, image information display regions 66h-66r corresponding to all the image display regions 66a-66m performing image display may be displayed, as in the above-described case. The displayed image information is not limited to the icon shown in FIG. 15. For example, numerical information or character information indicating the frame rate or the like may also be displayed. The image information is displayed not only in the summary mode, but also, of course, in the above-described gaze mode.

When simultaneously displaying four images, also, a signal from the synthesizer 102 may be considered to represent an image for one frame, and four images may be displayed on only one image display region 66q. At that time, the image display regions 66n-66p become unnecessary (not shown).

FIG. 16 is a flowchart illustrating processing for displaying image information. Image processing is realized, for example, by an event loop (step S01). When there is a displayed image-region group, every time an image for one frame is transmitted from the corresponding camera 16 and the image display region is updated in each of the image regions 66a-66f (step S02), the corresponding image information display region is displayed (step S03). Flashing of an icon can be realized according to a conventional ordinary procedure. When the image from the camera represented by the camera icon 62c is dragged onto the image display region 66c (step S04), the image display region 66c is added to the displayed image-region group (step S05), and the corresponding image information region 66j is displayed (step S03).

By flashing the icon every time the image from the camera is updated in the image information display region, the property to confirm that even an image having little movement (image difference) is normally received and is operating can be easily improved.

As for an image from a camera distributed by the switcher, by flashing the icon every time the image from the camera is updated in the image information display region, the property to confirm that even an image having little movement (image difference) is normally received and is operating can be easily improved.

Particularly when simultaneously displaying four images, the frame rate allocated for one image will be relatively reduced. Even in such a case, by clearly indicating that an image is normally received and is operating, the property to confirm normal operation of the image can be easily improved.

By clearly indicating image information corresponding to each image distributed by the switcher, the state of distribution of a plurality of images can be easily confirmed.

By clearly indicating image information corresponding to each of four images simultaneously displayed using the switcher, the state of distribution of the images can be easily confirmed.

The objects of the present invention may, of course, be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, since reception means for receiving images generated from a plurality of communication terminals, output means for outputting the images received by the reception means in order to display the images on a display unit as multiple images, and notification means for grasping and notifying a state of reception of the images by the reception means are provided, the operator can easily identify the state of reception.

Since the frame rate of an image being received can be notified, it is possible to prevent misdetermination by the operator as a failure which may occur, for example, when the frame rate of the image is small because the speed of the network is low or because display processing (display, decoding (in the case of a compressed image), and display) of the communication apparatus is slow. Thus, the operator can easily recognize the state of reception. Furthermore, the value of the frame rate can be easily confirmed.

It is possible to perform notification only when there is the possibility of misunderstanding of the operator, in accordance with the frame rate.

In addition, the state of reception of images generated from a plurality of communication terminals can be easily identified.

The individual components shown in outline or designated by blocks in the drawings are all well known in the communication apparatus and method, and storage medium arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:
a reception unit for receiving frame images generated from a plurality of cameras via a network in a summary mode in which frame images generated from a plurality of cameras are displayed automatically and independently of users' control operation;
an output unit for outputting the frame images received by said reception unit in order to display the frame images for each respective communication terminal on a display unit as multiple image displays corresponding respectively to each of the plurality of cameras;
a detection unit for automatically detecting whether or not, for each respective camera, a current frame image displayed by the display unit is updated by a next frame image being received by the reception unit without users' control operation in the summary mode; and
a notification unit for causing the display unit to display, for each respective one of the multiple image displays, an icon indicating an update state of the received frame images for the respective image display, wherein the icon is displayed on a predetermined area of the display unit at a time when the corresponding frame image is displayed,
wherein said notification unit causes a flashing icon to be displayed corresponding to an updating state when the detection unit detects that a current frame image displayed by the display unit is updated by a next frame image, and causes a non-flashing icon to be displayed corresponding to a non-updating state when the detection unit detects that a current frame image displayed by the display unit is not updated by a next frame image,
wherein, in the summary mode, receiving one frame image from the camera corresponds to displaying the flashing icon one time and display of the non-flashing icon corresponds to a period of time between receiving the one frame image from the camera and receiving a subsequent frame image from the camera, and
wherein said notification unit does not perform notification when a frame rate of the received frame images is high, and performs notification when the frame rate is reduced.

2. A communication method comprising the steps of:
receiving frame images generated from a plurality of cameras via a network in a summary mode in which frame images generated from a plurality of cameras are displayed automatically and independently of users' control operation;
outputting the received frame images in order to display the frame images for each respective camera on a display unit as multiple image displays corresponding respectively to each of the plurality of cameras;
automatically detecting whether or not, for each respective camera, a current frame image displayed by the display unit is updated by a next frame image being received without users' control operation in the summary mode; and
causing the display unit to display, for each respective on of the multiple image displays, an icon indicating an update state of the received frame images for the respective image display, wherein the icon is displayed on a predetermined area of the display unit at a time when the corresponding frame image is displayed,
wherein said causing the display unit to display an icon causes a flashing icon to be displayed corresponding to an updating state when the detecting detects that a current frame image displayed by the display unit is updated by a next frame image, and causes a non-flashing icon to be displayed corresponding to a non-updating state when the detecting detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said causing the display unit to display an icon does not perform notification when a frame rate of the received frame images is high, and performs notification when the frame rate is reduced.

3. A communication apparatus comprising:

a reception unit for receiving a part or all of frame images generated from image generation units of a plurality of corresponding cameras via a network in a summary mode, in which frame images generated from a plurality of cameras are displayed automatically and independently of users' control operation, by switching the frame images;

an output unit for outputting the frame images received by said reception unit in order to display the frame images for each respective camera on a display unit as multiple image displays corresponding respectively to each of the plurality of cameras;

an assigning unit for assigning an arbitrary image display from among the multiple image displays;

a control unit for controlling a state of outputting of the image display assigned by said assigning unit;

a detection unit for automatically detecting whether or not, for each respective camera, a current frame image displayed by the display unit is updated by a next frame image being received by the reception unit without users' control operation in the summary mode; and a notification unit for causing the display unit to display, for each respective one of the multiple image displays, an icon indicating an update state of the received frame images for the respective image display, wherein the icon is displayed on a predetermined area of the display unit at a time when the corresponding frame image is displayed, wherein said notification unit causes a flashing icon to be displayed corresponding to an updating state when the detection unit detects that a current frame image displayed by the display unit is updated by a next frame image, and causes a non-flashing icon to be displayed corresponding to a non-updating state when the detection unit detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said notification unit does not perform notification when a frame rate of the received frame images is high, and performs notification when the frame rate is reduced.

4. A communication method comprising the steps of:

receiving a part or all of frame images generated from image generation units of a plurality of corresponding cameras via a network in a summary mode, in which frame images generated from a plurality of cameras are displayed automatically and independently of users' control operation, by switching the frame images;

outputting the received frame images in order to display the frame images for each respective camera on a display unit as multiple image displays corresponding respectively to each of the plurality of cameras;

assigning an arbitrary image display from among the multiple image displays;

controlling a state of outputting of the assigned image display;

automatically detecting whether or not, for each respective camera, a current frame image displayed by the display unit is updated by a next frame image being received without user' control operation in the summary mode; and causing the display unit to display, for each respective one of the multiple image displays, an icon indicating an update state of the received frame images for the respective image display, wherein the icon is displayed on a predetermined area of the display unit at a time when the corresponding frame image is displayed, wherein said causing the display unit to display an icon causes a flashing icon to be displayed corresponding to an updating state when the detecting detects that a current frame image displayed by the display unit is updated by a next frame image, and causes a non-flashing icon to be displayed corresponding to a non-updating state when the detecting detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said causing the display unit to display an icon does not perform notification when a frame rate of the received frame images is high, and performs notification when the frame rate is reduced.

5. A computer-readable storage medium storing a computer-executable program, said program comprising:

reception process code executable to receive frame images generated from a plurality of cameras via a network in a summary mode in which frame images generated from a plurality of cameras are displayed automatically and independently of users control operation;

output process code executable to output the received frame images in order to display the frame images for each respective camera on a display unit as multiple image displays corresponding respectively to each of the plurality of cameras;

detection process code executable to automatically detect whether or not, for each respective camera, a current frame image displayed by the display unit is updated by a next frame image being received without users' control operation in the summary mode; and notification process code executable to cause the display unit to display, for each respective one of the multiple image displays, an icon indicating an update state of the received frame images for the respective image display, wherein the icon is displayed on a predetermined area of the display unit at a time when the corresponding frame image is displayed, wherein said notification process code causes a flashing icon to be displayed corresponding to an updating state when the detection process code detects that a current frame image displayed by the display unit is updated by a next frame image, and causes a non-flashing icon to be displayed corresponding to a non-updating state when the detection process code detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said notification process code does not perform notification when a frame rate of the received frame images is high, and performs notification when the frame rate is reduced.

6. A computer-readable storage medium storing a computer-executable program, said program comprising:

reception process code executable to receive a part or all of frame images generated from image generation units of a plurality of corresponding cameras via a network in a summary mode, in which frame images generated from a plurality of cameras are displayed automatically and independently of users control operation, by switching the frame images;

output process code executable to output the received frame images in order to display the frame images for each respective camera on a display unit as multiple image displays corresponding respectively to each of the plurality of cameras;

assigning process code executable to assign an arbitrary image display from among the multiple image displays;

control process code executable to control a state for outputting of the assigned image display;

detection process code executable to automatically detect whether or not, for each respective camera, a current frame image displayed by the display unit is updated by a next frame image being received without users' control operation in the summary mode; and notification process code executable to cause the display unit to display, for each respective one of the multiple image displays, an icon indicating an update state of the received frame images for the respective image display, wherein the icon is displayed on a predetermined area of the display unit at a time when the received frame image is displayed on the corresponding image display, wherein said notification process code causes a flashing icon to be displayed corresponding to an updating state when the detection process code detects that a current frame image displayed by the display unit on the corresponding image display is updated by a next frame image, and causes a non-flashing icon to be displayed corresponding to a non-updating state when the detection process code detects that a current frame image displayed by the display unit on the corresponding image display is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said notification process code does not perform notification when a frame rate of the received frame images is high, and performs notification when the frame rate is reduced.

7. A communication apparatus comprising:

a reception unit for receiving frame images generated from a camera via a network in a summary mode in which frame images generated from the camera are displayed automatically and independently of users' control operation;

an output unit for outputting the frame images received by said reception unit in order to display the frame images on a display unit;

a detection unit for automatically detecting whether or not a current frame image displayed by the display unit is updated by a next frame image being received by the reception unit without users' control operation in the summary mode; and a notification unit for causing the display unit to display a symbol an icon indicating an update state of the received frame images, wherein the symbol icon is displayed on a predetermined area of the display unit at a time when the corresponding frame image is displayed, wherein said notification unit causes a flashing icon to be displayed corresponding to an updating state when the detection unit detects that a current frame image displayed by the display unit is updated by a next frame image, and causes a non-flashing icon to be displayed corresponding to a non-updating state when the detection unit detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said notification unit does not perform notification when a frame rate of the received frame images is high, and performs notification when the frame rate is reduced.

8. A communication method comprising the steps of:

receiving frame images generated from a camera via a network in a summary mode in which frame images generated from the camera are displayed automatically and independently of users' control operation;

outputting the frame images received in said receiving step in order to display the frame images on a display unit;

automatically detecting whether or not a current frame image displayed by the display unit is updated by a next frame image being received without users' control operation in the summary mode; and causing the display unit to display an icon indicating an update state of the received frame images, wherein the icon is displayed on a predetermined area of the display unit at a time when the frame image is displayed, wherein said causing the display unit to display an icon causes a flashing icon to be displayed corresponding to an updating state when the detecting detects that a current frame image displayed by the display unit is updated by a next frame image, and causes a non-flashing icon to be displayed corresponding to a non-updating state when the detecting detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said causing the display unit to display an icon does not perform notification when a fram rate of the received frame images is high, and performs notification when the frame rate is reduced.

9. A computer-readable storage medium storing a computer-executable program, said program comprising:

reception code executable to receive frame images generated from a camera via a network in a summary mode in which frame images generated from the camera are displayed automatically and independently of users' control operation;

output code executable to output the frame images received by said reception code in order to display the frame images on a display unit;

detection process code executable to automatically detect whether or not a current frame image displayed by the display unit is updated by a next frame image being received without users' control operation in the summary mode; and notification code executable to cause the display unit to display an icon indicating an update state of the received frame images, wherein the icon is displayed on a predetermined area of the display unit at a time when the received frame image is displayed, wherein said notification code causes a flashing icon to be displayed corresponding to an updating state when the detection process code detects that a current frame image displayed by the display unit is updated by a next frame image, and causes a non-flashing icon to be displayed corresponding to a non-updating state when the detection process code detects that a current frame image displayed by the display unit is not updated by a next frame image, wherein, in the summary mode, receiving one frame image from the camera corresponds to displaying the flashing icon one time and display of the non-flashing icon corresponds to a period of time between receiving the one frame image from the camera and receiving a subsequent frame image from the camera, and wherein said notification code does not perform notification when a fram rate of the received frame images is high, and performs notification when the frame rate is reduced.

* * * * *

UNITED STATES PATENT AND TRADEMARK OFFICE
CERTIFICATE OF CORRECTION

PATENT NO. : 7,262,791 B2
APPLICATION NO. : 09/358933
DATED : August 28, 2007
INVENTOR(S) : Kohno et al.

It is certified that error appears in the above-identified patent and that said Letters Patent is hereby corrected as shown below:

COLUMN 2:
        Line 13, "dipslay" should read -- display --;
        Line 20, "dipslay" should read -- display --;
        Line 46, "provided," should read -- provided. --; and
        Line 50, "dipslay" should read -- display --.

COLUMN 4:
        Line 45, "dipslay" should read -- display --.

COLUMN 5:
        Line 8, "capature" should read -- capture --.

COLUMN 6:
        Line 41, "dipslayed" should read -- displayed --;
        Line 51, "dustbin" should read -- trash bin --; and
        Line 53, "dustbin" should read -- trash bin --.

COLUMN 12:
        Line 62, "avaiable" should read -- available --.

COLUMN 18:
        Line 59, "on" should read -- one --.

COLUMN 20:
        Line 16, "user" should read -- users' --.

COLUMN 22:
        Line 20, "a symbol" should be deleted; and
        Line 21, "symbol" should be deleted.

UNITED STATES PATENT AND TRADEMARK OFFICE
CERTIFICATE OF CORRECTION

PATENT NO. : 7,262,791 B2
APPLICATION NO. : 09/358933
DATED : August 28, 2007
INVENTOR(S) : Kohno et al.

It is certified that error appears in the above-identified patent and that said Letters Patent is hereby corrected as shown below:

COLUMN 23:
Line 10, "fram" should read -- frame --.

COLUMN 24:
Line 22, "fram" should read -- frame --.

Signed and Sealed this

Eleventh Day of November, 2008

JON W. DUDAS
*Director of the United States Patent and Trademark Office*